(12) United States Patent
Kim

(10) Patent No.: US 12,059,069 B2
(45) Date of Patent: Aug. 13, 2024

(54) PORTABLE READING STAND

(71) Applicant: Seong Won Kim, Ulsan (KR)

(72) Inventor: Seong Won Kim, Ulsan (KR)

( * ) Notice: Subject to any disclaimer, the term of this patent is extended or adjusted under 35 U.S.C. 154(b) by 0 days.

(21) Appl. No.: 17/604,447

(22) PCT Filed: Apr. 20, 2020

(86) PCT No.: PCT/KR2020/095073
§ 371 (c)(1),
(2) Date: Oct. 18, 2021

(87) PCT Pub. No.: WO2020/214017
PCT Pub. Date: Oct. 22, 2020

(65) Prior Publication Data
US 2022/0192367 A1    Jun. 23, 2022

(30) Foreign Application Priority Data

Apr. 18, 2019  (KR) .................. 20-2019-0001622
Jun. 26, 2019  (KR) .................. 10-2019-0076003
Oct. 16, 2019  (KR) .................. 10-2019-0128493
Apr. 9, 2020   (KR) .................. 10-2020-0043057

(51) Int. Cl.
*A47B 23/04* (2006.01)
*A47B 23/06* (2006.01)

(52) U.S. Cl.
CPC .......... *A47B 23/044* (2013.01); *A47B 23/043* (2013.01); *A47B 23/06* (2013.01); *A47B 2023/049* (2013.01); *A47B 2220/0016* (2013.01)

(58) Field of Classification Search
CPC ..... A47B 23/044; A47B 23/06; A47B 23/043; A47B 2023/049; A47B 2220/0016; A47B 23/042; A47B 23/04; G06F 1/203; G06F 1/166; F16M 13/00; F16M 11/10
USPC ....................................................... 248/456
See application file for complete search history.

(56) References Cited

U.S. PATENT DOCUMENTS

| | | | | |
|---|---|---|---|---|
| 2,583,097 | A * | 1/1952 | Heimann | A47B 19/06 248/456 |
| 2,595,682 | A * | 5/1952 | Lipa | A47B 23/044 248/460 |
| 4,323,214 | A * | 4/1982 | DeLuca | A47B 23/043 248/452 |
| 4,460,146 | A * | 7/1984 | Raggiotti | A47G 1/142 248/456 |
| 4,555,128 | A * | 11/1985 | White | A47B 23/043 281/31 |

(Continued)

FOREIGN PATENT DOCUMENTS

| JP | 3141153 U | 4/2008 | | |
|---|---|---|---|---|
| KR | 200437092 Y1 * | 11/2007 | ............. | A47B 23/06 |

(Continued)

OTHER PUBLICATIONS

International Search Report for PCT/KR2020/095073 mailed Jul. 21, 2020 from Korean Intellectual Property Office.

*Primary Examiner* — Taylor Morris
(74) *Attorney, Agent, or Firm* — Revolution IP, PLLC

(57) ABSTRACT

The present invention relates to a portable reading stand that not only serves as a reading stand for holding books, but also holds objects such as a portable electronic device such as a laptop and tablet, and can freely adjust the height and angle according to eye level of correct posture.

11 Claims, 19 Drawing Sheets

(56) References Cited

U.S. PATENT DOCUMENTS

| | | | | |
|---|---|---|---|---|
| 4,771,976 | A * | 9/1988 | Su | A47B 23/043 248/172 |
| 4,852,498 | A * | 8/1989 | Judd | A47B 23/043 190/11 |
| 4,989,353 | A * | 2/1991 | Astolfi | A47G 1/142 40/761 |
| 5,366,197 | A * | 11/1994 | Westland | A47G 1/143 248/452 |
| 5,433,415 | A * | 7/1995 | Samson | A47B 23/06 248/448 |
| 5,492,299 | A * | 2/1996 | Thermos | A47B 23/043 248/456 |
| 5,639,053 | A * | 6/1997 | Dmitriev | A47B 23/043 248/460 |
| 5,797,578 | A * | 8/1998 | Graffeo | A47B 23/043 248/456 |
| 5,799,372 | A * | 9/1998 | Brunner | F16M 11/10 16/342 |
| 6,178,085 | B1 * | 1/2001 | Leung | G06F 15/0216 235/145 R |
| 6,293,591 | B1 * | 9/2001 | Pecci | B42D 3/126 281/51 |
| 6,971,622 | B2 * | 12/2005 | Ziegler | H04M 1/12 248/455 |
| 7,758,009 | B1 * | 7/2010 | Chang | A47B 23/044 248/456 |
| 7,770,864 | B2 * | 8/2010 | Phifer | A47B 23/043 248/455 |
| 7,828,260 | B2 * | 11/2010 | Hauser | A47B 23/043 248/920 |
| 7,891,632 | B2 * | 2/2011 | Rucinski | A47B 23/044 248/447 |
| 7,950,617 | B2 * | 5/2011 | Zhu | F16M 13/005 248/469 |
| 8,038,114 | B2 * | 10/2011 | Ting | G06F 1/203 248/676 |
| 8,322,290 | B1 * | 12/2012 | Mignano | A47B 23/043 248/456 |
| 8,424,465 | B2 * | 4/2013 | Florendo, Jr. | A47B 23/043 248/456 |
| 8,487,169 | B2 * | 7/2013 | Dunlop | A47B 23/042 248/443 |
| 8,534,619 | B2 * | 9/2013 | Huang | F16M 13/00 248/463 |
| D693,824 | S * | 11/2013 | Erdfarb | D14/447 |
| 8,763,977 | B2 * | 7/2014 | Huang | F16M 13/022 16/326 |
| 8,800,937 | B1 * | 8/2014 | Lee | F16M 11/10 248/65 |
| 9,999,297 | B1 * | 6/2018 | Arceta | A47B 23/06 |
| 10,098,452 | B2 | 10/2018 | Ko | |
| 11,278,114 | B2 * | 3/2022 | Jeon | A47B 23/06 |
| 11,553,788 | B1 * | 1/2023 | Jeong | A47B 23/043 |
| 2008/0037213 | A1 * | 2/2008 | Haren | G06F 1/1632 108/7 |
| 2009/0179132 | A1 * | 7/2009 | Qin | A47B 23/043 248/371 |
| 2009/0283655 | A1 * | 11/2009 | Fukuda | F16M 11/10 248/454 |
| 2009/0314913 | A1 * | 12/2009 | Gillis | G06F 3/0395 248/346.01 |
| 2010/0155346 | A1 * | 6/2010 | Cheng | A47B 23/043 211/13.1 |
| 2011/0056412 | A1 * | 3/2011 | Grammer | A45C 9/00 108/1 |
| 2015/0115125 | A1 * | 4/2015 | Hou | A47B 23/043 248/454 |
| 2015/0192244 | A1 * | 7/2015 | Haarburger | F16M 13/00 248/459 |
| 2016/0015141 | A1 * | 1/2016 | Feinberg | A47B 23/042 206/45.24 |
| 2017/0318958 | A1 * | 11/2017 | Asante | A47B 13/023 |
| 2020/0045157 | A1 * | 2/2020 | Ajani | H04M 1/04 |
| 2022/0000258 | A1 * | 1/2022 | Kim | G06F 1/20 |

FOREIGN PATENT DOCUMENTS

| | | | | |
|---|---|---|---|---|
| KR | 20-0463680 Y1 | 11/2012 | | |
| KR | 10-1256024 B1 | 4/2013 | | |
| KR | 20-0472673 Y1 | 5/2014 | | |
| KR | 10-1477984 B1 | 1/2015 | | |
| KR | 20-0478862 Y1 | 11/2015 | | |
| KR | 20-0479333 Y1 | 1/2016 | | |
| KR | 102026051 B1 * | 9/2019 | | A47B 20/06 |
| KR | 20190129642 A * | 11/2019 | | A47B 23/043 |
| KR | 20200051502 A * | 5/2020 | | B42F 1/02 |
| KR | 20200061316 A * | 6/2020 | | A47B 23/043 |
| KR | 20200109865 A * | 9/2020 | | A47B 23/042 |
| KR | 20200110115 A * | 9/2020 | | A47B 23/06 |
| KR | 20200002192 U * | 10/2020 | | A47B 23/043 |

\* cited by examiner

PORTABLE READING STAND

CROSS REFERENCE TO PRIOR APPLICATIONS

This application is the 35 U.S.C. 371 national stage of International application PCT/KR2020/095073 filed on Apr. 20, 2020; which claims priority to Korean applications 20-2019-0001622 filed on Apr. 18, 2019, 10-2019-0076003 filed on Jun. 26, 2019, 10-2019-0128493 filed on Oct. 16, 2019 and 10-2020-0043057 filed on Apr. 9, 2020. The entire contents of each of the above-identified applications are hereby incorporated by reference.

TECHNICAL FIELD

The present invention relates to a portable reading stand that not only serves as a reading stand for holding books, but also holds objects such as a portable electronic device such as a laptop and tablet, and can freely adjust the height and angle according to eye level of correct posture.

BACKGROUND ART

In general, a reading stand includes a top plate for supporting an object to be mounted, a bracket on which the object is placed, and a bottom plate for supporting the top plate to have a predetermined angle.

The conventional reading stand has a structure in which a bracket, a bottom plate, etc. can be folded in a foldable manner as well as a fixed type. However, even if it is folded, a part of the bracket or the bottom plate still protrudes when folded. Therefore, the conventional reading stand is bulky and inconvenient to carry. (See FIG. 1) Accordingly, a portable reading stand and a cradle that is foldable, small in volume, and lightweight have been developed.

In order to solve the above problems, Korean registered Utility Model No. 20-0463680 ("portable folding reading stand") and Korean registered Patent No. 10-1256024 ("folding reading stand") are disclosed.

The Korean registered Utility Model No. 20-0463680 ("portable folding reading stand") is the prior art 1 and has the advantage of being small in volume and light when folded. However, since the front support member supporting the back of the book is weak, it lacks stability when writing. And in the prior art 1, it is difficult to properly hold the book pages with the fixing pin for fixing the book pages. In addition, prior art 1 has a disadvantage in that there is a high possibility that a book page is caught and torn by a lower support member supporting the bottom of the book when the page is turned over in structure.

Korean Patent Registration No. 10-1256024 ("folding reading stand") is the prior art 2, and has the advantage of being small and light when folded. However, in the prior art 2, the guide frame supporting the back of the book is weak, so it lacks stability when writing. Also, the pedestal that supports the bottom of the book is sparsely formed, which also lacks stability. Therefore, there is a disadvantage that there is a high possibility that the page will get caught and torn when turning the page. In addition, there is a problem in that it is difficult for the booker (press part) to hold the page properly due to its structure. Therefore, there is a need for a portable reading stand that compensates for these problems.

DISCLOSURE

Technical Problem

As has been devised to solve the above problems, the present invention is configured such that the bracket and the bottom plate unit respectively coupled to the upper plate are foldable. And an object of the present invention is to provide a portable reading stand having a flat shape that does not protrude from the top plate when folded, so that it is easy to carry.

Technical Solution

In order to achieve the above object, the portable reading stand according to the present invention includes a top plate, a bracket, and a bottom plate unit. The top plate is provided with the bracket receiving part for accommodating the bracket at the lower end of the front portion, and has a bottom plate unit receiving part at the rear portion. The bracket is retractably coupled to the bracket receiving part. The bottom plate unit is retractably coupled to the bottom plate unit receiving part. The portable reading stand according to the present invention has a flat shape on both the front and rear surfaces when the bracket is accommodated in the bracket receiving part, and the bottom plate unit is accommodated in the bottom plate unit receiving part when carrying.

The bottom plate unit receiving part is formed at a position higher than the bracket receiving part on the rear surface of the top plate. The bottom plate unit is retractably fastened into the bottom plate unit receiving part at a position higher than the position of the bracket receiving part. Accordingly, the portable reading stand has a strong supporting force by forming a thick and strong bottom plate, and can be folded flat when carrying.

The bracket is hinged to both sides of the lower end of the bracket receiving part. The bottom plate unit includes a bottom plate and an angle support. The bottom plate is hinged to both lower sides of the bottom plate unit receiving part. The angle support is hinged to both sides of the middle of the bottom plate unit receiving part and is supported on the bottom plate to adjust the inclination of the top plate. The angle support is fastened to be positioned between the bottom plate unit receiving part and the bottom plate.

The top plate is configured to be separated into a front plate and a rear plate. The bracket receiving part and the bottom plate unit receiving part are formed through the front plate and the rear plate. When carrying, the bracket is accommodated in the bracket receiving part, and the bottom plate unit is accommodated in the bottom plate unit receiving part. Accordingly, both the front and the back of the reading stand have a flat shape.

A plurality of fastening bodies or fastening holes is formed at corresponding positions of the front plate and the rear plate, respectively. The front plate and the rear plate are coupled by inserting a fastening body into each other or by inserting a fastening member through the fastening hole. Therefore, the reading stand is characterized in that both the front and the back have a flat shape when carrying.

In addition, fastening members are provided on both sides of the bottom plate and both sides of the bottom plate unit receiving part. At least one of the fastening members is configured by an elastic hinge coupling having an elastic force. As a result, the angle support is fixed in the unfolded state of the bottom plate, and the top plate is fixed to the bottom surface. When the fixing of the angle support is removed, the bottom plate is automatically folded toward the top plate by the restoring force against the elastic force. Accordingly, the bottom plate is automatically folded without protruding out of the rear surface of the top plate.

When configured by an elastic hinge coupling, the fastening member includes a fastening groove, a bottom plate fastening protrusion, and an elastic body. The fastening groove is formed on the side surface of the bottom plate, the bottom plate fastening protrusion is coupled to the fastening groove on the side or inner side of the bottom plate unit receiving part, and the elastic body is sandwiched between the fastening groove and the bottom plate fastening protrusion. It has a structure in which the bottom plate is automatically folded toward the top plate by the elastic force of the elastic body fitted as described above. As a result, the bottom plate is automatically folded without protruding out of the rear of the top plate.

The fastening groove and the bottom plate fastening protrusion are characterized in that formed at mutually opposite positions.

And at least one of the fastening groove and the bottom plate fastening protrusion comprises a fitting body for providing an elastic force by fitting one end of the elastic body.

When one of the fastening parts is configured to be hinged, a receiving groove capable of accommodating the bottom plate fastening member is formed on the inner surface of the bottom plate receiving groove. The bottom plate fastening member is seated in the receiving groove and fixed to the front plate or the rear plate. The bottom plate fastening member includes a fastening body coupled to the side of the bottom plate and a fastening hole that can be fixed to the inside of the front plate or the rear plate. In a state in which the fastening body is coupled to the side surface of the bottom plate, the bottom plate fastening member may be coupled and fixed through the fastening hole. Therefore, hinge coupling is possible by fastening the bottom plate between the front plate or the rear plate.

The top plate may further include a plurality of heat dissipation through-holes or a cooling fan for dissipating heat generated when the portable electronic device is mounted.

The bracket further includes a book gripper configured in a curved bar shape coupled to be rotatable up and down so that it can be folded or unfolded on the front when unfolded. The bracket receiving part is configured in a shape that can be accommodated together with the bracket in the folded state of the book gripper. Therefore, when the bracket is inserted and accommodated into the bracket receiving part, the front surface of the top plate has a flat shape.

The bracket includes a book gripper receiving groove and a book gripper rotatably coupled to and inserted from the book gripper receiving groove. Therefore, if necessary, it can be used by rotating the book gripper from the book gripper receiving groove.

The book gripper includes a lower book gripper and an upper fixing holder. One end of the lower book gripper is coupled to the book gripper receiving groove by a first fastening member. The first fastening member serves as an axis and is coupled so that the lower book gripper is rotatable up and down. The upper book gripper is coupled by a second fastening member at the other end of the lower book gripper. The upper book gripper is rotatably coupled to the left and right as the second fastening member serves as an axis. And the book gripper receiving groove may be configured in a shape for accommodating the shape of the book gripper.

Advantageous Effects

The reading stand according to the present invention can be used as a portable reading stand by being folded flat without a protruding part when carrying it, and can be used by holding a book in a stable manner even when writing.

In addition, by forming a bottom plate unit receiving part on the rear upper end of a position higher than the bracket receiving part at the lower front of the top plate, and fastening the bottom plate and the angle support to the side of the bottom plate unit receiving part at a position higher than the bracket receiving part, the supporting force is increased. And the stand can be mounted stably without being reduced.

And it can stably mount not only books, but also portable electronic devices such as laptops and pads, as well as various other objects. It is possible to reduce the weight by separating the top plate into two parts, and the pedestal, angle support, and bottom plate can be easily installed between the two plates, so manufacturing is simple.

DESCRIPTION OF DRAWINGS

FIGS. 7 and 8 are views showing the top plate according to the first embodiment, and FIGS. 9 to 11 are views showing the top plate according to the second embodiment.

BEST MODES OF THE INVENTION

The reading stand according to the present invention has a bracket receiving part in the front lower part of the top plate so that a bracket can be inserted, and a bottom plate unit receiving part is formed in the rear of the top plate so that a bottom plate unit can be inserted. Accordingly, when the bracket and the bottom plate unit are accommodated, the reading stand has a flat shape.

Modes of the Invention

Hereinafter, a preferred embodiment of the present invention will be described in detail with reference to the drawings.

The reading stand according to the present invention has a bracket receiving part in the front lower part of the top plate so that a bracket can be inserted, and a bottom plate unit receiving part is formed in the rear of the top plate so that a bottom plate unit can be inserted. Accordingly, when the bracket and the bottom plate unit are accommodated, the reading stand has a flat shape.

Figure 1:
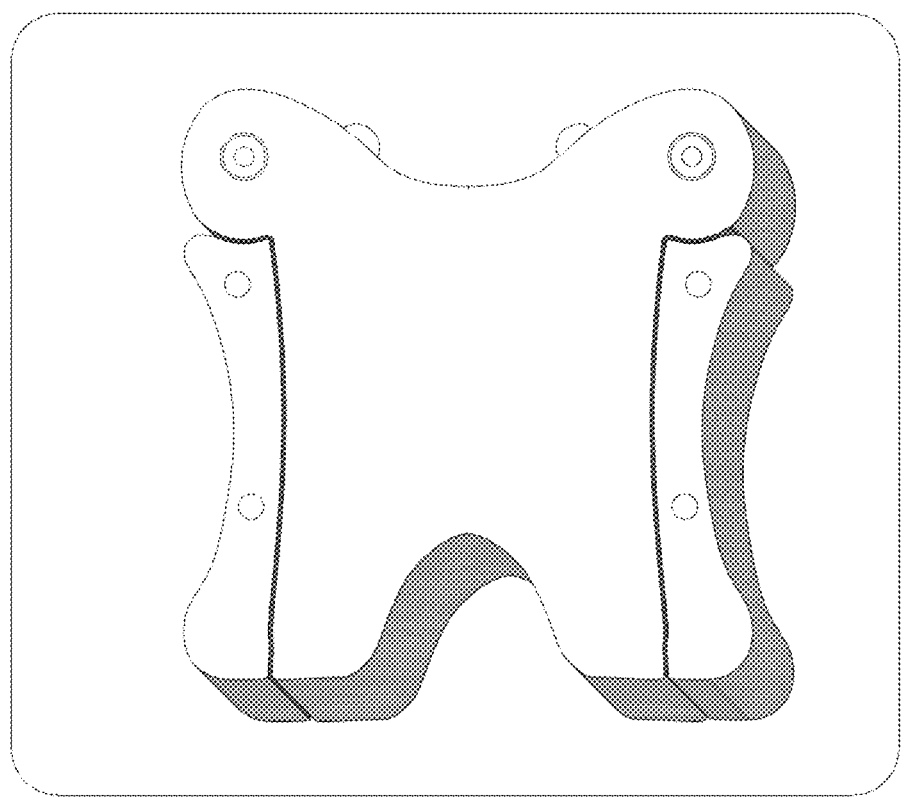
FIG. 1 schematically shows a conventional reading stand having many protruding parts when folded.
Figure 2:
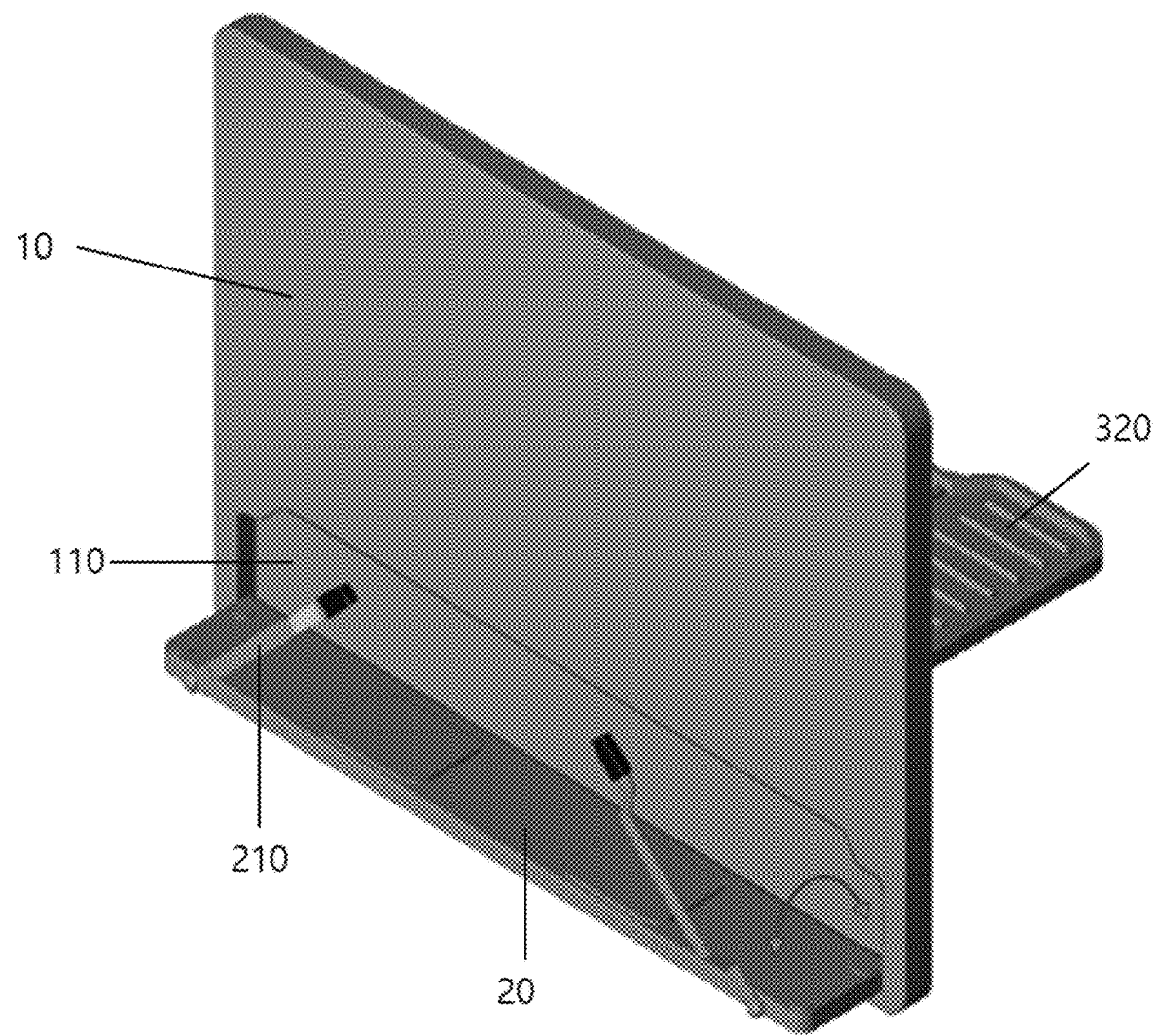
FIGS. 2 and 3 schematically show a case in which the portable reading stand is unfolded for use according to a preferred embodiment of the present invention.
Figure 3:
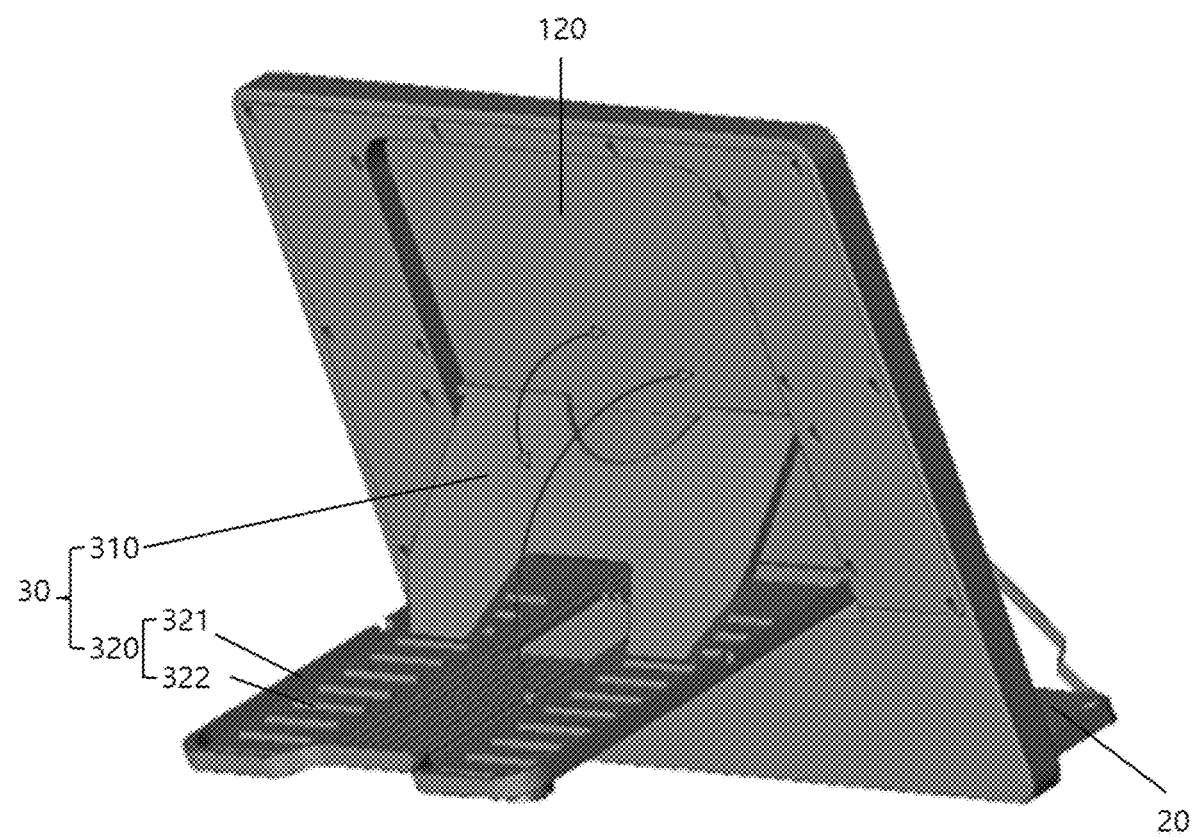

FIGS. 2 and 3 schematically show a case in which the portable reading stand is unfolded for use according to a preferred embodiment of the present invention.

Figure 4:
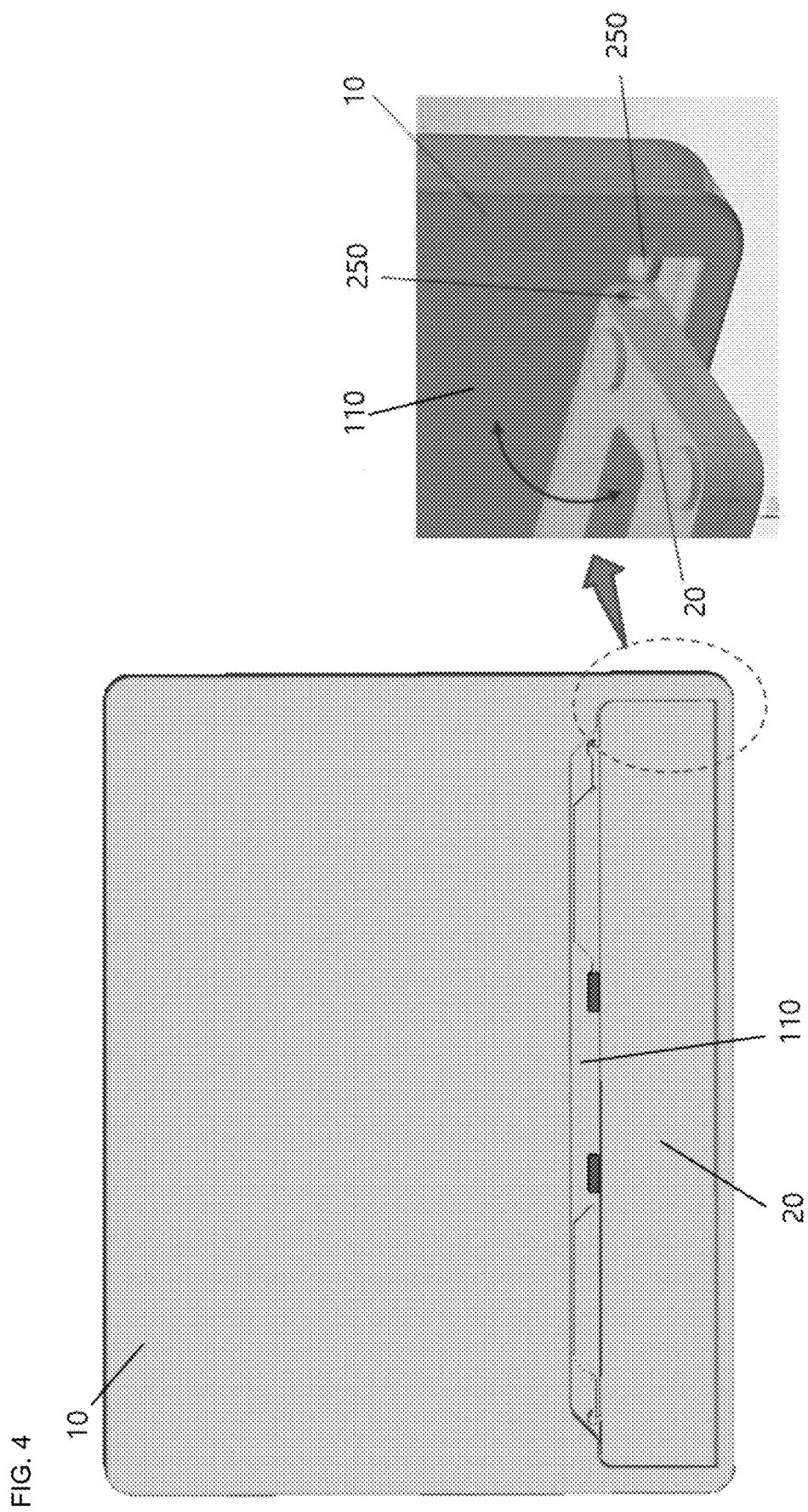
FIGS. 4 and 5 schematically show a case in which the portable reading stand is folded for carrying.
Figure 5:
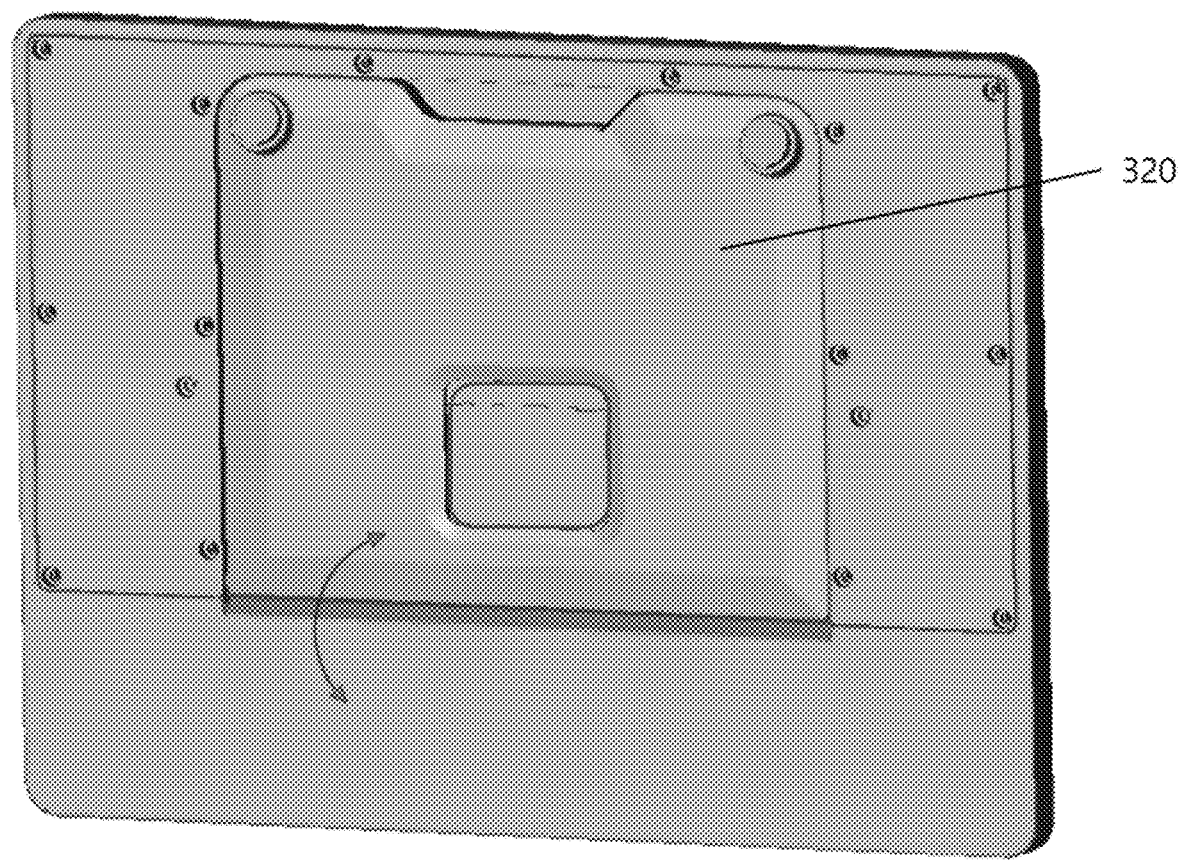
Figure 6:
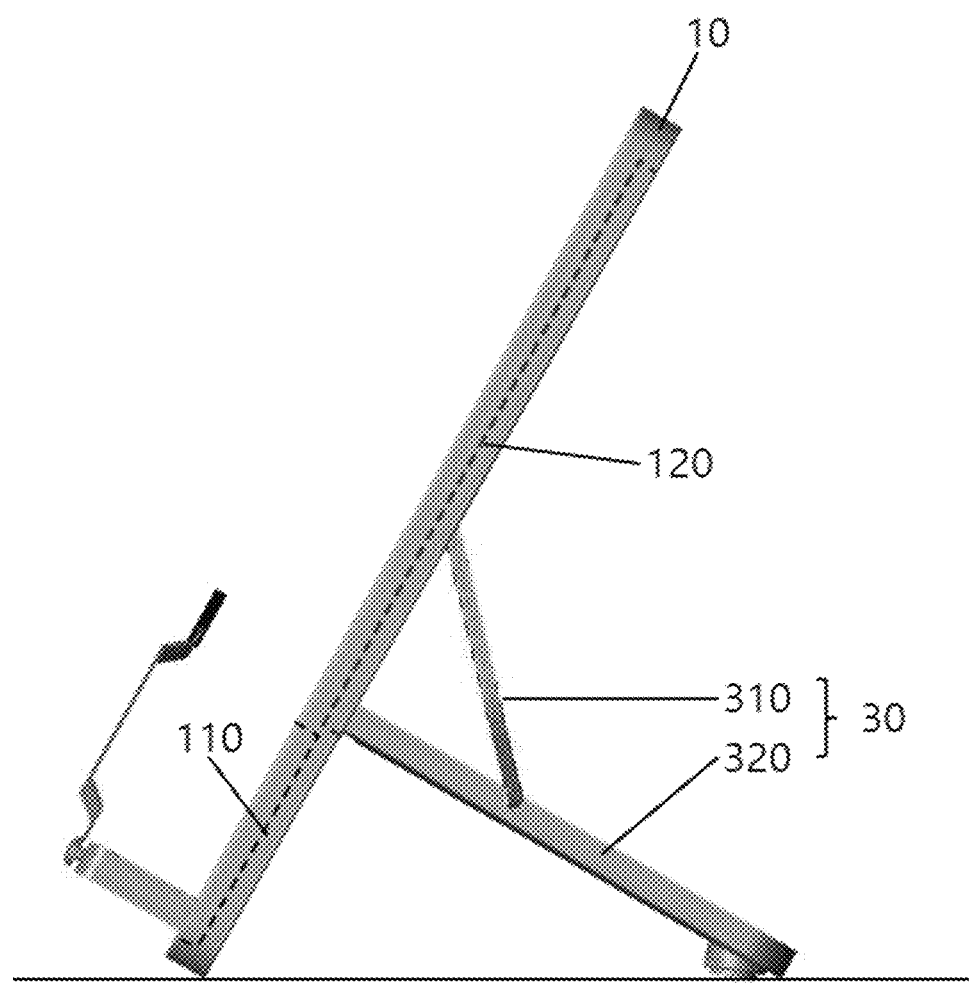
FIG. 6 is a side view of FIG. 2.

FIGS. 4 and 5 schematically show a case in which the portable reading stand is folded for carrying. FIG. 6 is a side view of FIG. 2.

Referring to FIGS. 2 to 6, the portable reading stand according to the present invention is provided with a bracket receiving part 110 on the front of the top plate and a bottom plate unit receiving part 120 on the rear. The bracket 20 is fastened to the bracket receiving part 110 so as to be folded and unfolded by rotation due to hinge coupling. The bottom plate unit 30 is fastened to the bottom plate unit receiving part 120 to be folded and unfolded.

Accordingly, when carrying, the bracket 20 is accommodated in the bracket receiving part 110, and the bottom plate unit 30 is accommodated in the bottom plate unit receiving part 120. Therefore, since the front and rear surfaces of the top plate are flat, it is easy to carry.

More specifically, the top plate 10 includes a bracket receiving part 110 into which the bracket formed at the lower end of the front part is inserted and the bottom plate unit receiving part 120 formed at a higher position than the bracket receiving part 110 of the rear part. The bracket 20 is fastened to the bracket receiving part 110, and the bottom plate unit 30 is fastened to the bottom plate unit receiving part 120 to support the top plate 10. Here, the bottom plate unit 30 may be formed in the bottom plate unit receiving part 120 at a position higher than the position of the bracket receiving part 110.

When the bracket receiving part 110 in which the bracket 20 can be accommodated is formed at the lower end of the front portion of the top plate 10 as described above, the bracket 20 can be accommodated in the bracket receiving part 110 when carrying. Therefore, in use, the pedestal 20 can be unfolded out of the bracket receiving part 110 to be used.

Here, hinge member 250 is formed on both sides of the bracket 20 and the inner surface of the bracket receiving part so that the bracket 20 can be rotated, so that it can be unfolded or folded into the bracket receiving part 110. The hinge member 250 may be composed of a protrusion and a groove for accommodating the protrusion as shown in FIG. 4, and the protrusion and the groove may be formed at positions opposite to each other.

And the bottom plate unit receiving part 120 capable of accommodating the bottom plate unit 30 including the bottom plate 320 and the angle support 310 is formed in the rear portion of the top plate 10.

When carrying, the bottom plate unit 30 can be accommodated in the bottom plate unit receiving part 120 like the bracket 20. And when in use, the bottom plate unit 30 can be unfolded out from the bottom plate unit receiving part 120.

At this time, what is important is the formation position of the bottom plate 320. When viewed from the side, if the bottom plate 320 is formed on the rear surface of the top plate immediately adjacent to the range or within the range in which the bracket receiving part 110 is formed, the thickness of the top plate remaining behind the bracket receiving part 110 becomes thin. Therefore, in order to accommodate the bottom plate 320, the thickness of the bottom plate 320 is inevitably reduced. This results in loss of support.

Therefore, in order to prevent such a problem of insufficient support, the bottom plate 320 is formed at a position higher than that of the bracket receiving part 110. Accordingly, it is possible to provide a reading stand with a strong supporting force while being folded flat.

The top plate according to the present invention may be made of a synthetic resin material, and may be manufactured through an injection process in a mold.

However, the top plate 10 has a bracket receiving part 110 on the front side and a bottom plate unit receiving part 120 on the back side, so that the front and rear thicknesses are different from each other. Therefore, it is difficult to inject the top plate 10 into a single plate. In addition, defects such as inconsistency in thickness, sliding or distortion, and dimensional error may occur during injection application. In addition, since the inside is filled, the weight is heavy, which may cause a problem of inconvenient carrying.

Accordingly, in the present invention, two plates are manufactured in a module form and combined to produce a top plate. Therefore, it is easy to manufacture by injection, and it is possible to prevent defects and reduce weight.

More specifically, the top plate 10 may have a structure in which the front plate 11 and the rear plate 12 are coupled. The rear plate 12 may be configured in a structure (first structure) in which the rear plate 12 is formed and coupled only in the region of the rear plate coupling groove (A). And it may be composed of a structure (second structure) that is formed and coupled to the same size as the front plate 11. In addition, it is obvious that the two plates may be combined in other forms.

As described above, when the top plate 10 is manufactured in a configuration in which the front plate 11 and the rear plate 12 are separated and combined, the bottom plate unit 30 can be fastened by sandwiching it between the front plate 11 and the rear plate 12. Therefore, it is possible to easily manufacture and at the same time prevent the detachment of the bottom plate unit 30. In addition, it is easy to fasten the angle support 310 and the bottom plate 320, and it can be folded flat and carried in a slim form like a book.

Figure 7:
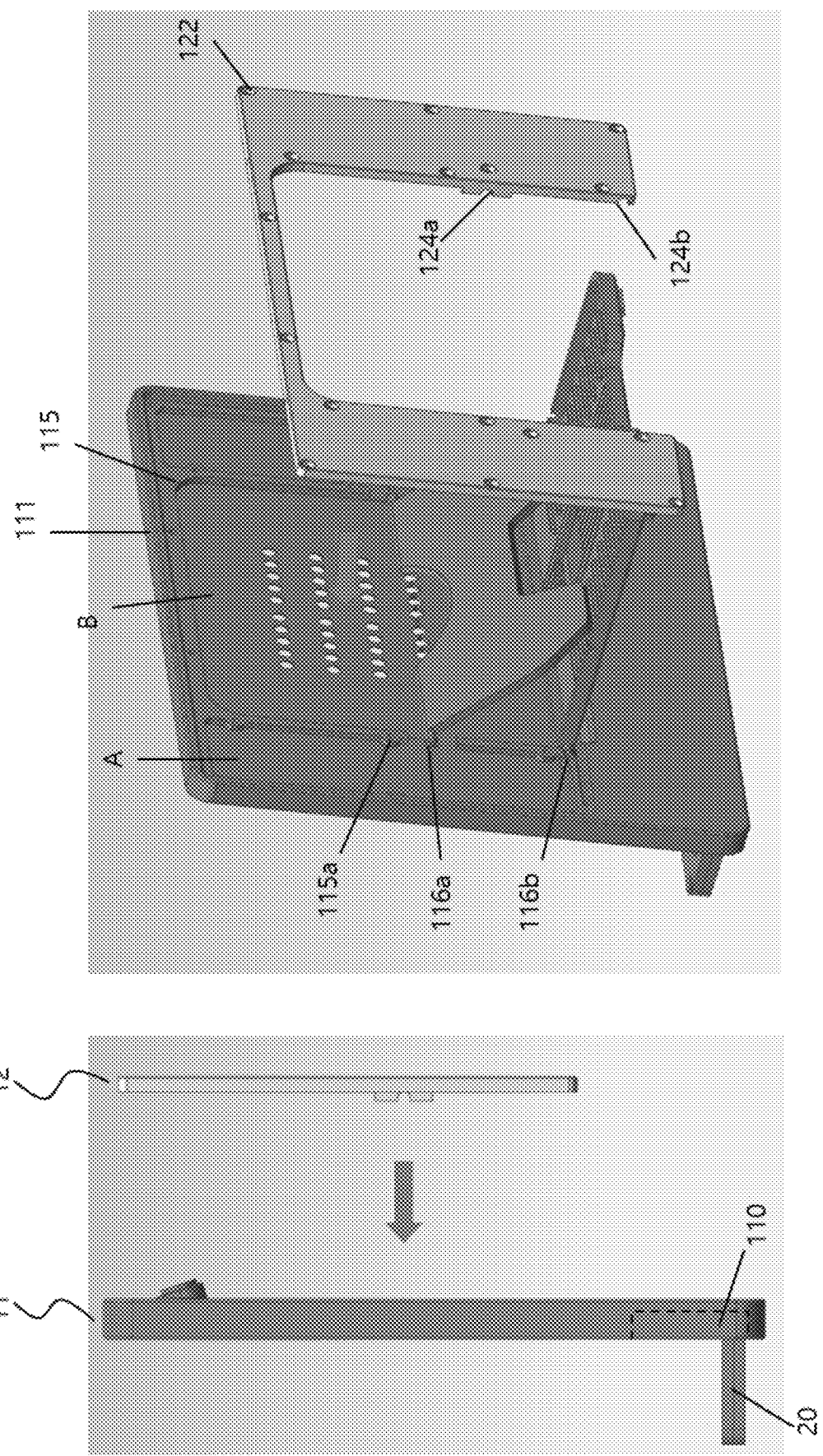
FIGS. 7 to 11 schematically show that the top plate according to a preferred embodiment of the present invention is configured to be separated into two plates.
Figure 8:
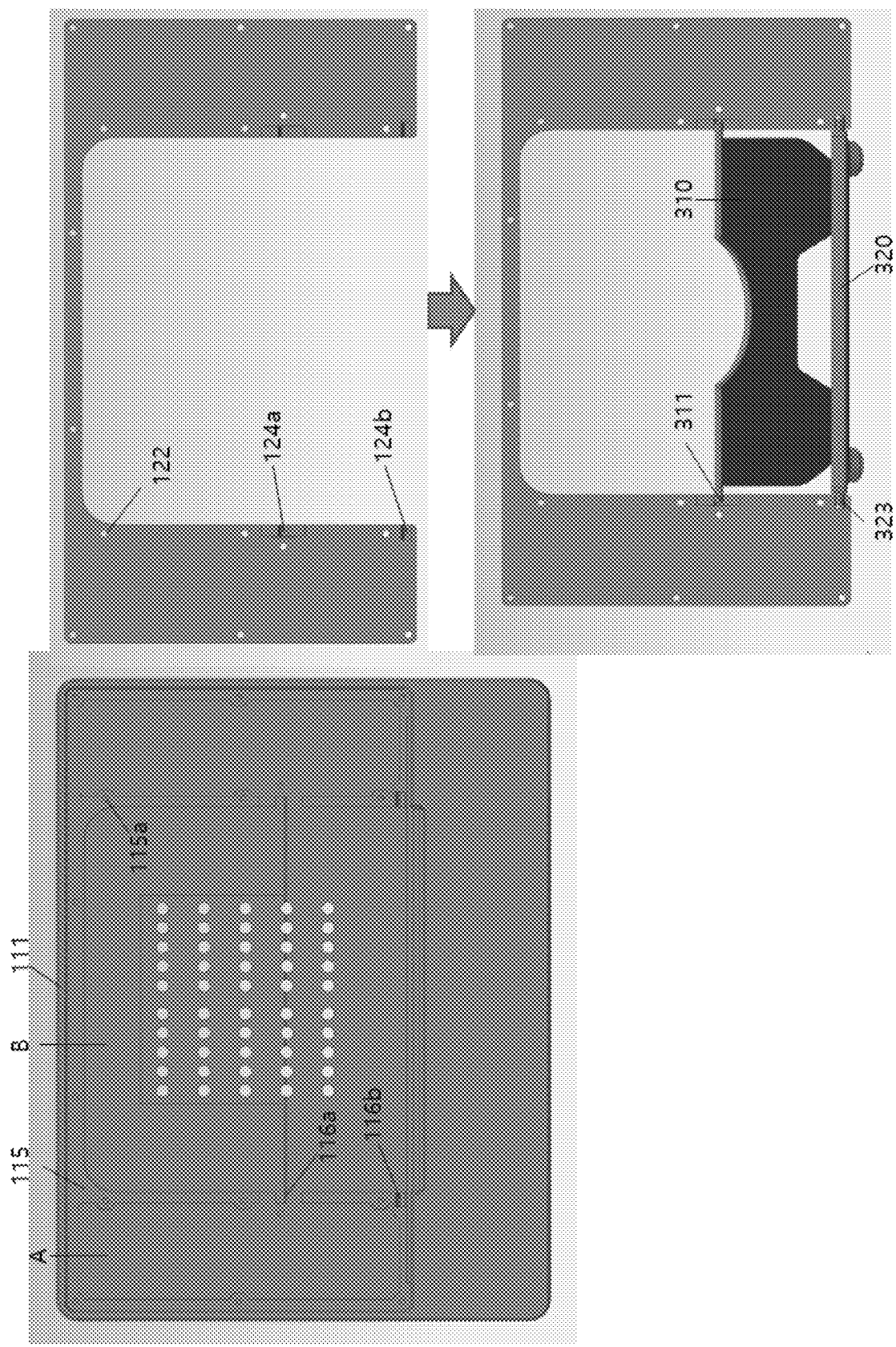

FIGS. 7 and 8 are views showing the top plate according to the first embodiment.

Referring to FIGS. 7 and 8, the front plate 11 has a bracket receiving part 110 in which the bracket 20 is accommodated at the lower end of the front face, and a rear plate coupling groove (A) and a bottom plate unit receiving part(B) in the upper part of the bracket receiving part of the rear face. The rear plate 12 is fastened to the rear plate coupling groove (A).

More specifically, the front protrusion guard 111 formed on the outside by the rear plate coupling groove (A) on the rear surface of the front plate 11 is formed. And a inner protrusion guard 115 is formed at the boundary dividing the rear plate coupling groove (A) and the bottom plate unit receiving part (B).

Here, the rear plate 12 is fastened on the inner protrusion guard 115 and is fastened. The sum of the thicknesses of the inner protrusion guard 115 and the rear plate 12 is configured to be the same as the thickness of the front protruding guard 111, whereby when the rear plate 12 is fastened, it has a flat shape.

A front plate fastening hole 115a is formed in the inner protrusion guard 115. And since the rear plate fastening hole 122 is formed at a position corresponding to the front plate fastening hole 115*a*, the fastening member is inserted and fixed through the front plate fastening hole 115*a* and the rear plate fastening hole 122.

Accordingly, the front plate 11 and the rear plate 12 can be integrally fastened in a flat shape.

Here, the fastening member may be composed of a screw or a bolt. The front plate fastening hole 115*a* and the rear plate fastening hole 122 may be formed of a screw hole or a bolt hole. And a thread may be provided inside at least one of the two fastening holes.

Figure 11:
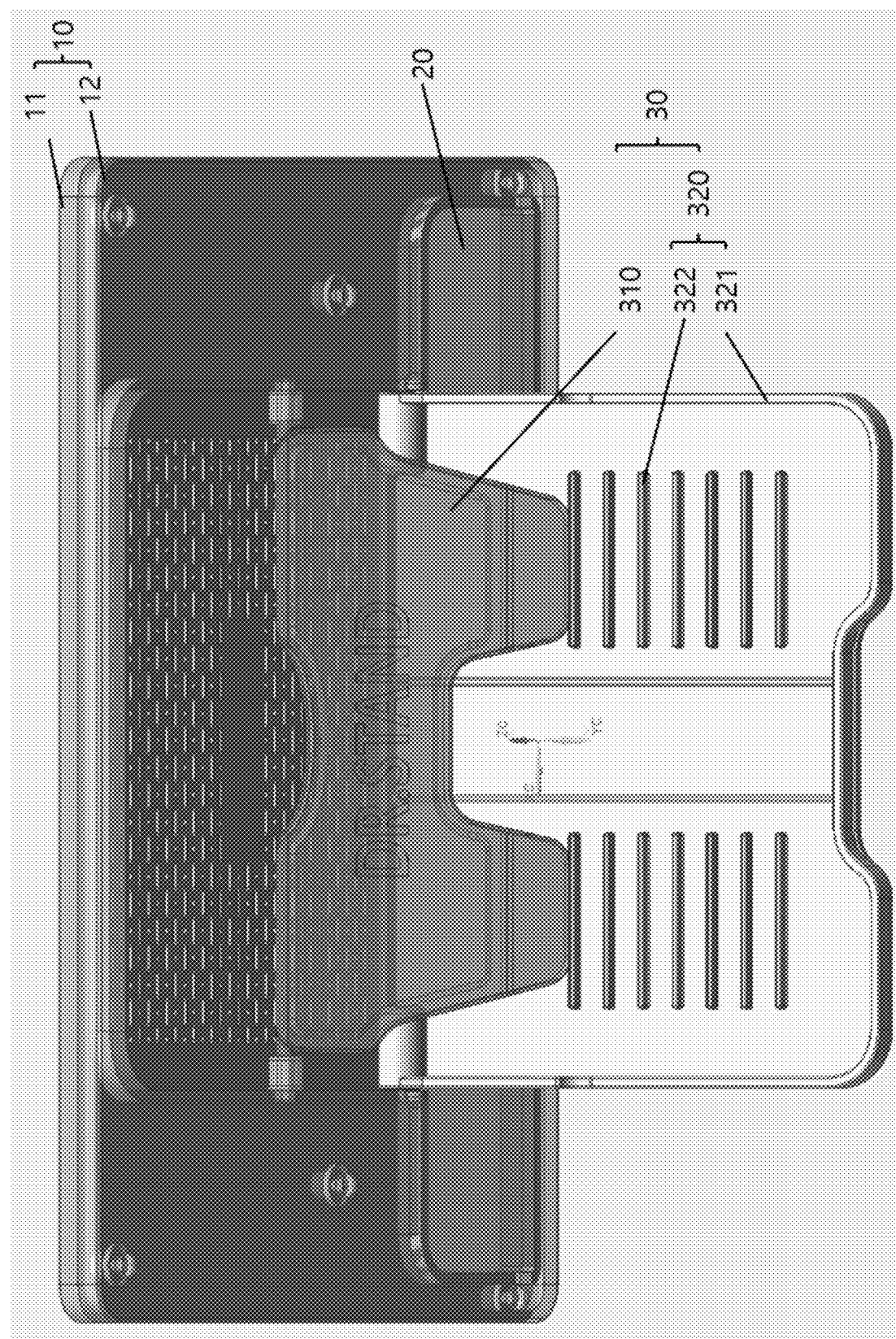
Figure 12:
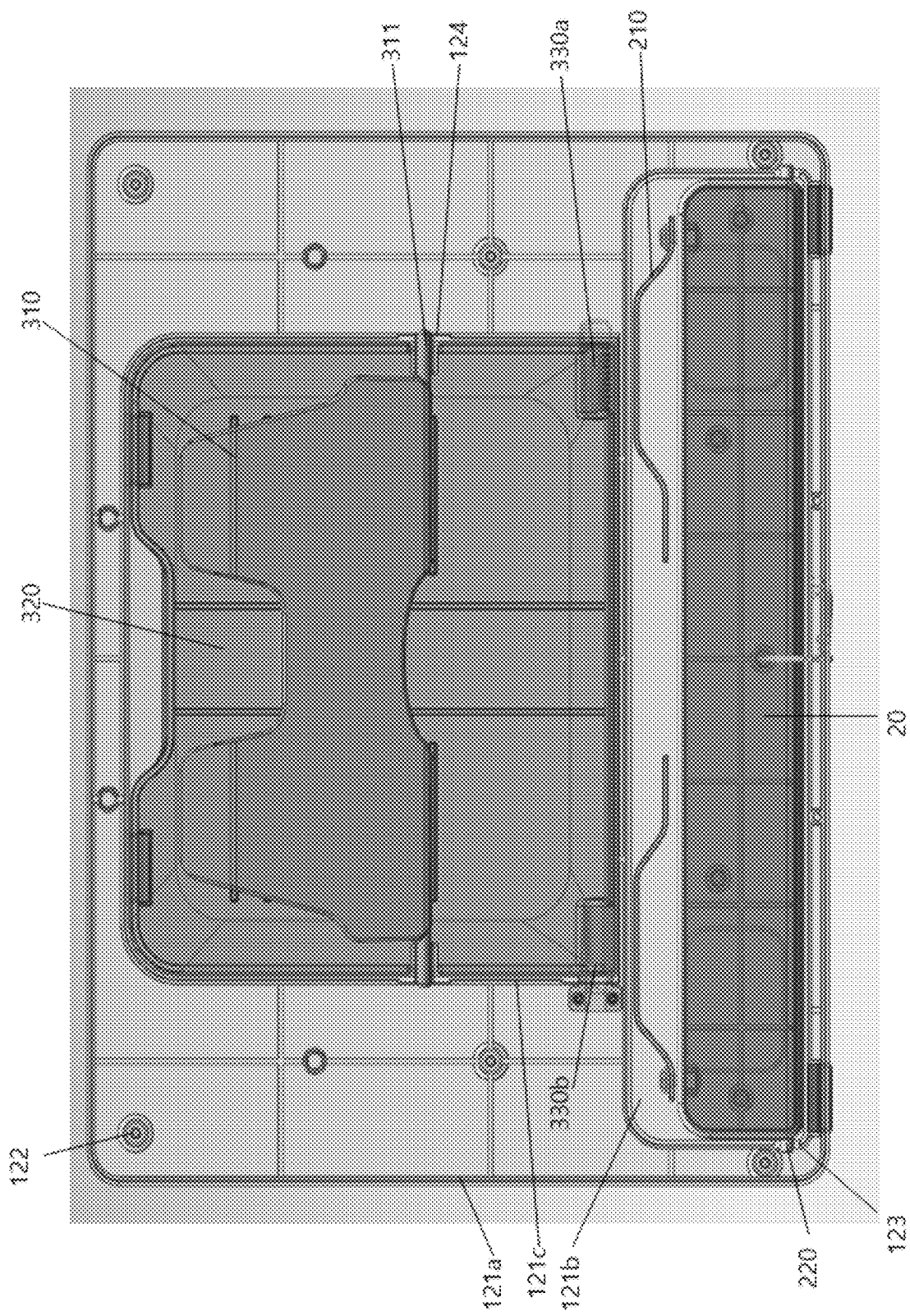
FIGS. 12 to 15 schematically show an internal structure to which a bracket and a bottom plate unit are fastened according to a preferred embodiment of the present invention.

In addition, the front plate 11 and the rear plate 12 are coupled to the grooves formed at positions corresponding to the plurality of protrusions as shown in FIG. 11, so that they can be coupled in a structure that does not require a separate fastening member.

The structure without the fastening member may be configured as a snap coupling in which the protrusion is fitted into the groove without tolerance, such as a snap button. The snap coupling may be detachably coupled. The protrusion and the groove may be formed at positions opposite to each other on the front plate and the rear plate.

The angle support fastening protrusion 311 is formed on both sides of the angle support 310 of the bottom plate unit. The angle support fastening protrusion 311 may be rotatably coupled through the angle support holder 116*a* of the front plate and the angle support holder 124*a* of the rear plate.

The angle support holder (116*a*, 124*a*) may be composed of a semi-circular groove. For this reason, it is possible to easily fasten the angle support fastening protrusion 311 having a circular cross section.

And a bottom plate fastening protrusions 323 are formed on both sides of the bottom plate 320 of the bottom plate unit. The bottom plate fastening protrusion 323 may be rotatably coupled through the bottom plate holder 116*b* of the front plate and the bottom plate holder 124*b* of the rear plate.

Here, the bottom plate fastening protrusion 323 and the bottom plate holders 116*b* and 124*b* may be elastically hinged by an elastic body. The bottom plate rotates and is fixed by the angle support in a state in which an elastic force is applied therein, so that the reading stand can be erected at a desired angle. Then, when the angle support is separated from the bottom plate to fold the reading stand, the bottom plate is automatically folded while returning to its original position by the restoring force. Therefore, it can be configured so that a separate hook is unnecessary.

A detailed configuration and action related to the elastic hinge coupling of the bottom plate 320 will be described in detail in the second structure to be described later.

Figure 9:
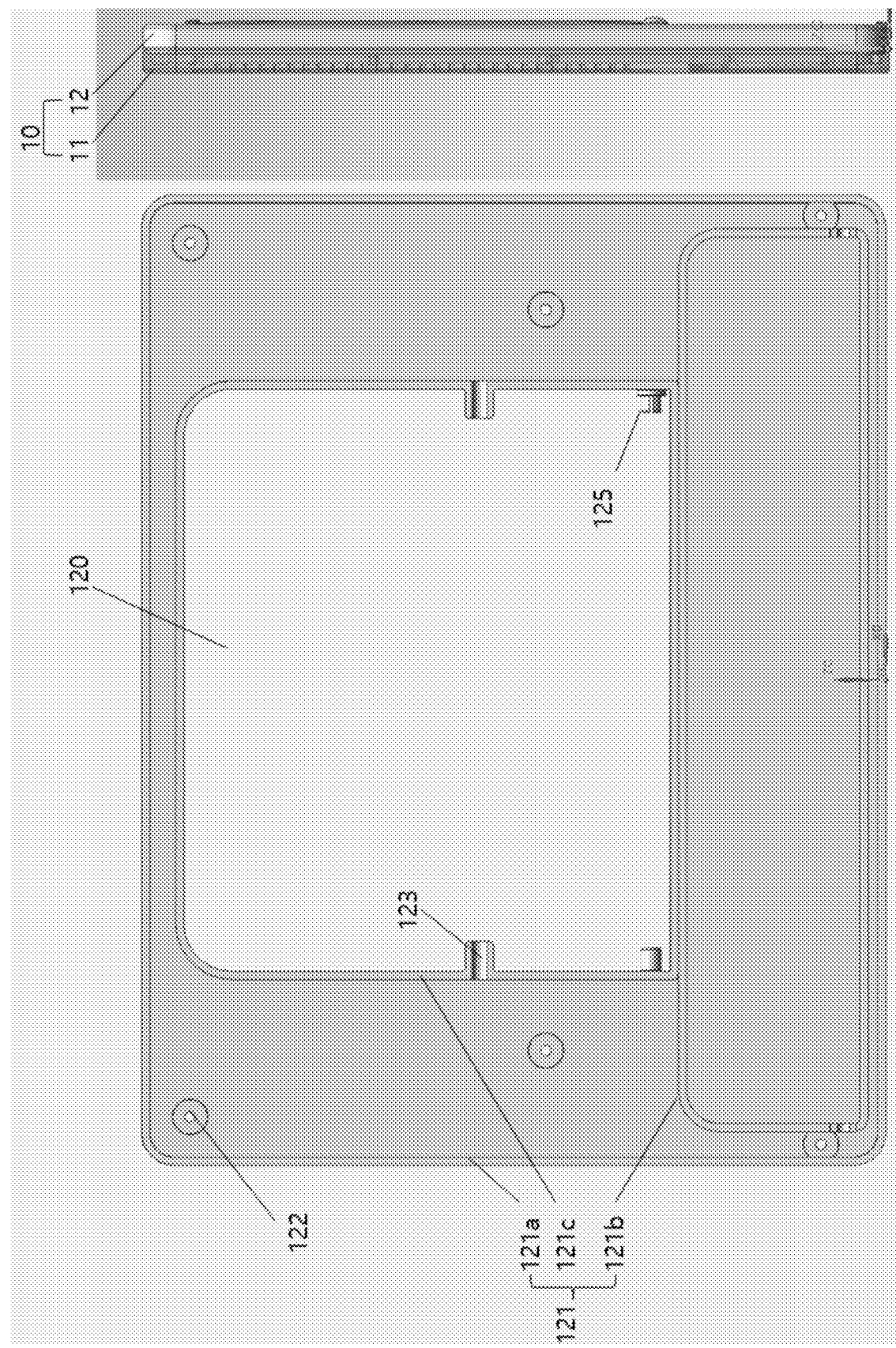
Figure 10:
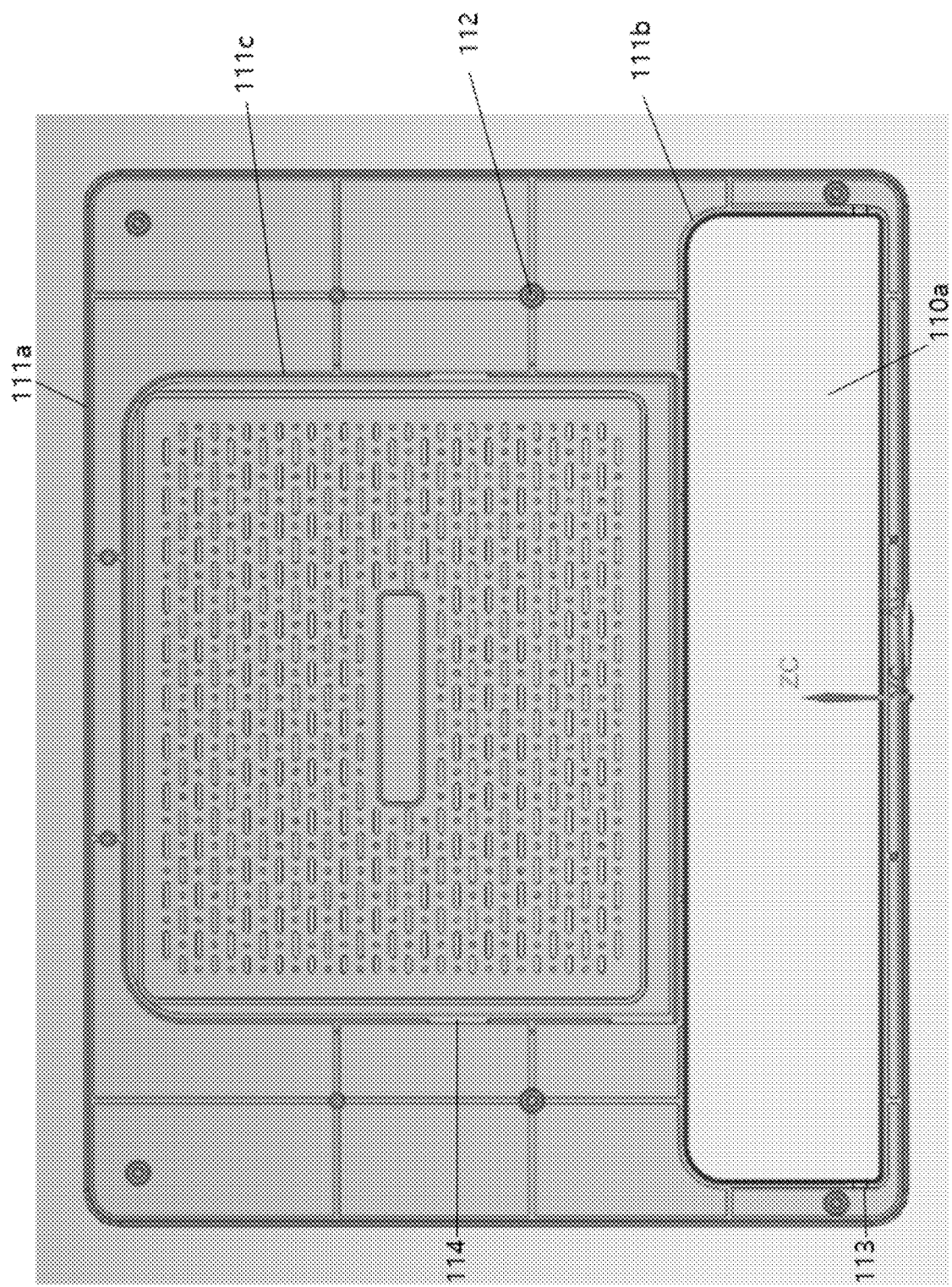

FIGS. 9 to 11 schematically show a top plate formed with a second structure according to a preferred embodiment of the present invention.

Referring to FIGS. 9 to 11, the bracket receiving part 110 in which the bracket 20 is accommodated is opened and formed at the lower end of the front plate 11. The bottom plate unit receiving part 120 in which the bottom plate unit is accommodated is opened and formed in the rear plate 12. The top plate 10 may be formed by fastening the front plate 11 and the rear plate 12.

Here, the front plate 11 has an open portion 110*a* in which only a portion of the bracket receiving part 110 is opened. A rear protrusion guard 121 may be formed at a position corresponding to the bracket receiving part 110 of the rear plate and outside the bottom plate unit receiving part 120 of the rear plate.

The front protrusion guard 111 and the rear protrusion guard 121 include outer protrusion guards 111*a*, 121*a*, pedestal receiving part protrusion guards 111*b*, 121*b*, and bottom plate unit receiving part protrusion guards 111*c*, 121*c*, respectively. The outer protrusion guards (111*a*, 121*a*) are formed on the outermost sides of the front plate and the rear plate, the bracket receiving part protrusion guards (111*b*, 121*b*) are formed on the outside of the bracket receiving part, and the bottom plate unit receiving part protrusion guards (111*c*, 121*c*) are formed outside the bottom plate unit receiving part.

In addition, fastening holes 112 and 122 may be formed at positions corresponding to the front plate 11 and the rear plate 12, respectively. A fastening member such as a screw or a pin is inserted through the fastening holes 112 and 122 so that the front plate 11 and the rear plate 12 can be integrally coupled. The fastening holes 112 and 122 may be fastened without a screw thread therein, and may have a screw thread therein. As described above, the front plate 11 and the rear plate 12 may be formed in a structure without a fastening member that can be fastened without a separate fastening member by having grooves corresponding to the protrusions as shown in FIG. 6C.

Here, the fastening holes 112 and 122 of the front plate 11 and the rear plate 12 may be configured to protrude by the same height as the heights of the front and rear protrusion guards 111 and 121.

Accordingly, the front protrusion guard 111 of the front plate 11 and the rear protrusion guard 121 of the rear plate contact each other and are integrally coupled. In a state where the fastening hole 112 of the front plate and the fastening hole 122 of the rear plate are in contact, they are coupled through the fastening member to increase the coupling force. And since the top plate can be configured in a hollow shape, it is possible to reduce the weight and thus can be easily carried.

In addition, since the top plate 10 is separated into a front plate 11 and a rear plate 12, the bracket 20 coupled to the bracket receiving part 110, the angular support 310 and the bottom plate 320 coupled to the bottom plate unit receiving part 120 can be easily mounted. Therefore, it has the advantage of being very easy to manufacture.

More specifically, fastening protrusions each having a circular cross section are formed on both sides of the bracket, the angle support, and the bottom plate. The fastening grooves having a semicircular cross section are formed in the bracket receiving part protrusion guards 111*b* and 121*b* and the bottom plate unit protrusion guards 111*c* and 121*c* of the front plate 11 and the rear plate 12. The bracket, the angle support and the bottom plate are mounted in the fastening groove of one of the front plate 11 or the rear plate 12. Thereafter, the front plate 11 and the rear plate 12 are integrally fastened. Accordingly, it is possible to easily rotatably fasten the bracket, the angle support, and the bottom plate.

In a state where the angle support 310 according to the present invention is fitted to one of the front plate or the rear plate, the other plate is coupled. Therefore, it is easy to install. In addition, when the front plate and the rear plate are fastened, it has a structure in which separation of the angle support is prevented.

Here, the angle support or the bottom plate does not need to be coupled between the front plate and the rear plate of the top plate, and may be coupled to any one of the two plates, that is, to the side of the bottom plate receiving part. The bracket also does not need to be coupled between the front plate and the rear plate, and it is obvious that it may be coupled to either of the two plates, that is, to the side of the bracket receiving part.

FIGS. 12 to 15 schematically show an internal structure to which a bracket and a bottom plate unit are fastened according to a preferred embodiment of the present invention.

Referring to FIGS. 12 to 15, the bracket fastening protrusions 220 are formed on both sides of the bracket 20. The bracket fastening protrusion 220 is rotatably coupled through the bracket holders 113 and 123 formed in the bracket receiving part protrusion guard 111b of the front plate and the bracket receiving part protrusion guard 121b of the rear plate.

More specifically, the bracket fastening protrusion 220 may have a circular cross-section so that it can be rotated. The bracket holders 113 and 123 respectively formed in the bracket receiving part protrusion guards 111b and 121b are each configured as a semicircular groove in cross section. And when the front plate 11 and the rear plate 12 are combined, the cross-section becomes a circular groove to accommodate the bracket fastening protrusion 220.

The bracket fastening protrusion and the bracket holder may be formed at positions opposite to each other. It is not necessarily coupled between the front plate and the rear plate, and may be fastened to either one of the front plate or the rear plate, that is, both sides of the lower end of the bracket receiving part.

And angle support fastening protrusions 311 are formed on both sides of the angle support 310 of the bottom plate unit. The angle support fastening protrusion 311 is rotatable through the angle support holder 114, 124 formed in the bottom plate receiving part protrusion guard 111c of the front plate and the bottom plate receiving part protrusion guard 121c of the rear plate. And the angle support is not necessarily coupled between the front plate and the rear plate. It may be fastened to both sides of the bottom plate receiving part of either the front plate or the rear plate.

Here, the angular support fastening protrusion 311 may have a circular cross-section so that it can be rotated in the same way as the bracket. The angle support holders 114 and 124 formed in the bottom plate receiving part protrusion guards 111c and 121c are each configured as a semicircular groove in cross section. Accordingly, when the front plate 11 and the rear plate 12 are combined, the cross-section becomes a circular groove to accommodate the angular support fastening protrusion 311.

In addition, a fastening part 330 is provided between both sides of the bottom plate 320 and the bottom plate unit receiving part fastened to the bottom plate 320.

At least one of the fastening parts 330 may be configured as an elastic hinge coupling 330a having an initial elastic force. In a state in which the bottom plate 320 is unfolded, the angle support 310 is fixed on the bottom plate, and the upper plate 10 is supported on the bottom surface. When the fixing of the angle support 310 is removed, it has a structure that is automatically folded by the restoring force against the elastic force.

Here, when only one of the fastening parts 330 is configured as an elastic hinge coupling 330a, the other fastening part may be configured as a hinge coupling 330b to be rotatable.

Figure 13:
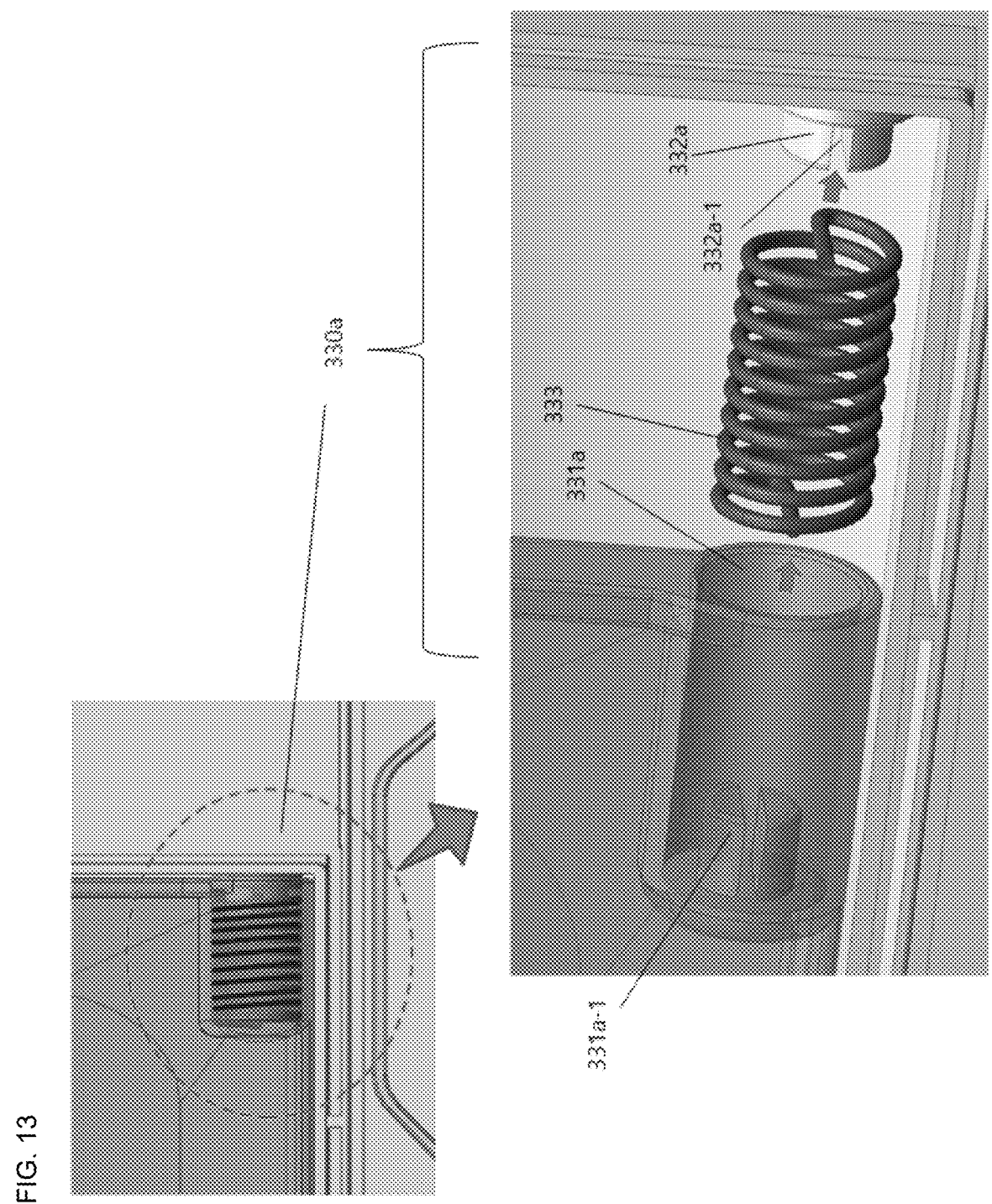
Figure 14:
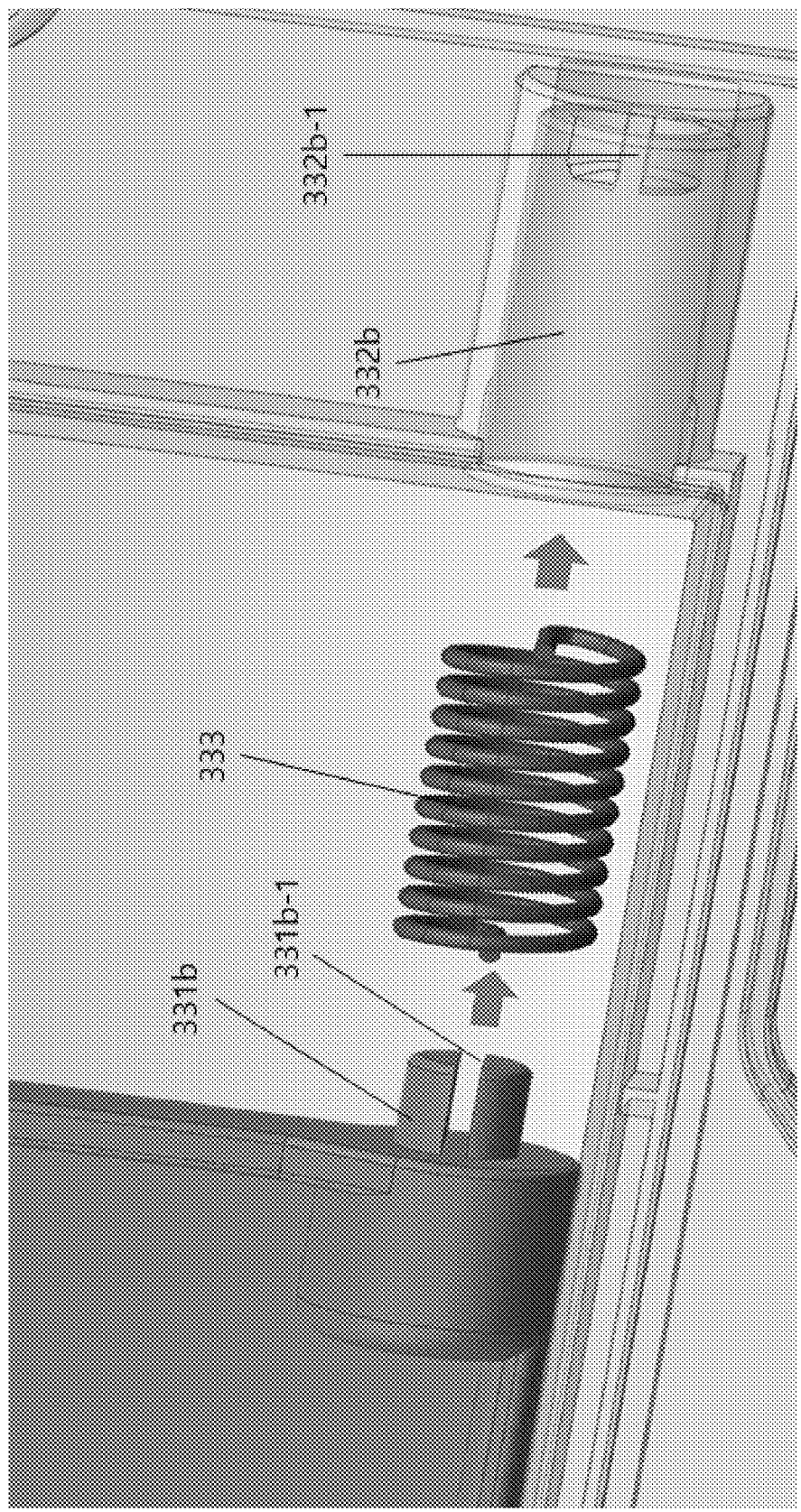

Referring to FIGS. 13 and 14, when the fastening part 330 is configured by an elastic hinge coupling 330a, a fastening groove 331a is formed in the side surface of the bottom plate. A bottom plate fastening protrusion 332a coupled to the fastening groove 331a is formed on the side or inner side of the bottom plate unit receiving part. An elastic body 333 may be fitted in the fastening groove 331a to form an elastic hinge coupling having an elastic force.

Here, both ends of the elastic body 333 are fixed to the fastening groove 331a and the bottom plate fastening protrusion 332a. The fastening groove 331a and the bottom plate fastening protrusion 332a may include fitting bodies 331a-1 and 332a-1 through which the ends of the elastic body 333 can be fitted.

In addition, the protrusions and grooves formed in the fastening part 330 may be configured at opposite positions to each other as shown in FIG. 8B. It is obvious that this can be applied to all combinations implemented in the embodiments according to the present invention.

That is, the fastening portion 330 has fastening protrusions 331b formed on both sides of the bottom plate. A bottom plate fastening groove 332b coupled to the fastening protrusion 331b is formed on the inner surface of the bottom plate unit receiving part. One end 333a of the elastic body 333 is fitted in the bottom plate fastening groove 332b to form an elastic hinge coupling having an elastic force.

Here, both ends of the elastic body 333 are fixed to the fastening protrusion 331b and the bottom plate fastening groove 332b. The fastening protrusion 331b and the bottom plate fastening groove 332b may include fitting bodies 331b-1 and 332b-1 through which the elastic body 333 can be fitted.

The fitting body may be formed on at least one end of both ends of the elastic body. One end 333a of the elastic body is manufactured to be bent. The fitting body may be formed in a structure capable of fitting the bent end. When one end of the elastic body is inserted into the fitting body and the bottom plate is rotated and unfolded, an elastic force to be maintained by the one end fitted in the fitting body is generated. And when the force is removed, the bottom plate is returned to its original position by the restoring force.

In addition, it is obvious that the embodiment related to the elastic hinge coupling of the bottom plate 320 is for convenience of description and can be modified into various configurations having the same effect.

Figure 15:
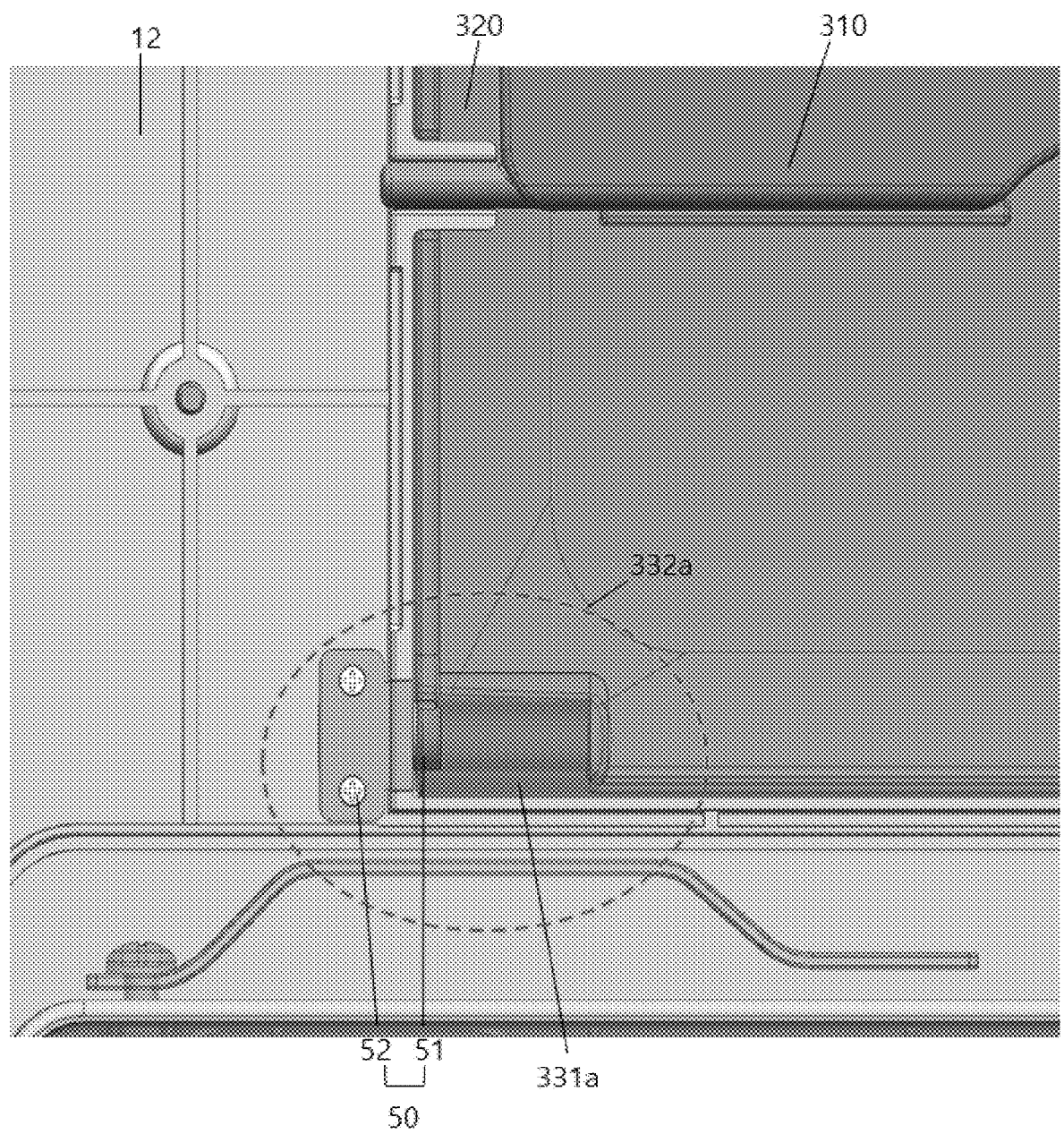

Hereinafter, the assembly process of the following structure will be described with reference to FIG. 15. One fastening part 330 is configured by an elastic hinge coupling, the other is configured by a hinge coupling, and a coupling groove 331a is formed on the side of the bottom plate, and the bottom plate fastening portion 330b coupled to the fastening groove 331a is formed on the inner surface of the bottom plate unit receiving part.

In a state in which one fastening part 330a is elastically hinged, the bottom plate fastening member 50 is inserted into the fastening groove 331a in the other fastening part 330b. Thereafter, the bottom plate fastening member 50 is fixed inside the rear plate. Here, a receiving groove capable of accommodating the bottom plate fastening member 50 rather than the bottom plate fastening protrusion may be formed on the inner surface of the bottom plate. The bottom plate fastening member 50 may be seated in the receiving groove and fixed to the rear plate.

Here, the bottom plate fastening member 50 may include a fastening body 51 and a fastening hole 52 capable of being fixed to the inside of the rear plate. In a state in which the fastening body 51 is inserted into the fastening groove 331a, fastening members such as bolts and pins are coupled and fixed through the fastening hole 52. Accordingly, the bottom plate 320 is fastened to the rear plate 12, so that hinge coupling is possible.

Here, the fastening body 51 is in the form of a protrusion inserted into the fastening groove (331a). However, on the contrary, the fastening body may be configured in the form of a groove and the fastening groove 331a may be configured in the form of a protrusion. And it is also obvious that the bottom plate fastening member 50 can be fixed to the front plate rather than the rear plate.

When the fastening protrusions are formed on both sides, it may be difficult to fasten the bottom plate to the inner surface of the bottom plate unit receiving part. However, if the bottom plate fastening member 50 is used, the bottom plate can be easily fastened in a state in which the fastening protrusion on one side is fastened.

The bottom plate 320 includes a protruded boundary guard 321 on the side and a plurality of support bars 322 inside the boundary guard. The boundary guard is coupled to the bottom plate unit receiving part 120 in contact with the bottom. An angle support 310 is hooked and fixed to one of the support bars. Accordingly, when the bottom plate 320 is accommodated in the bottom plate unit receiving part 120, it maintains a flat state without a protruding portion.

Here, the elastic body 333 is mounted so that the initial elastic force acts in the direction in which the bottom plate 320 is accommodated in the bottom plate unit receiving part 120. The bottom plate 320 is unfolded out from the bottom plate unit receiving part 120. In this state, the angle support 310 is rotated and fixed to the support bar 322 of the bottom plate. Then, the top plate 10 is supported by the bottom plate 320 while maintaining a constant angle.

And when the angle support 310 is rotated and folded, the bottom plate 320 is accommodated in the bottom plate unit receiving part 120 by restoring force. Accordingly, a configuration for maintaining the bottom plate 320 in the bottom plate unit receiving part 120 is unnecessary.

However, it may be configured to optionally further include a hook 330 for fixing the bottom plate 320 to the bottom plate unit receiving part 120.

As described above, the weight can be reduced by separating the top plate into a front plate and a rear plate. The bracket, the angle support, and the bottom plate can be fastened between the front plate and the rear plate, so manufacturing is very easy. In addition, the bracket, the angle support and the bottom plate can be accommodated in the bracket receiving part and the bottom plate unit receiving part. Therefore, since the front and rear surfaces of the top plate have a flat shape like a book, it has the advantage of being very easy to carry.

In general, the book gripper 210 serves to fix the currently unfolded position when the book is placed on the bracket 20. As in the embodiment of FIG. 2, when the bracket 20 is unfolded, it may be configured in a curved bar shape that can be rotatably coupled up and down so that it can be folded or unfolded from the front. Here, the bracket receiving part 110 is configured in a shape that can accommodate the bracket together with the book gripper when the bracket is folded. Therefore, when the bracket is accommodated in the bracket receiving part, the front surface of the top plate may be formed to have a flat shape.

Figure 16:
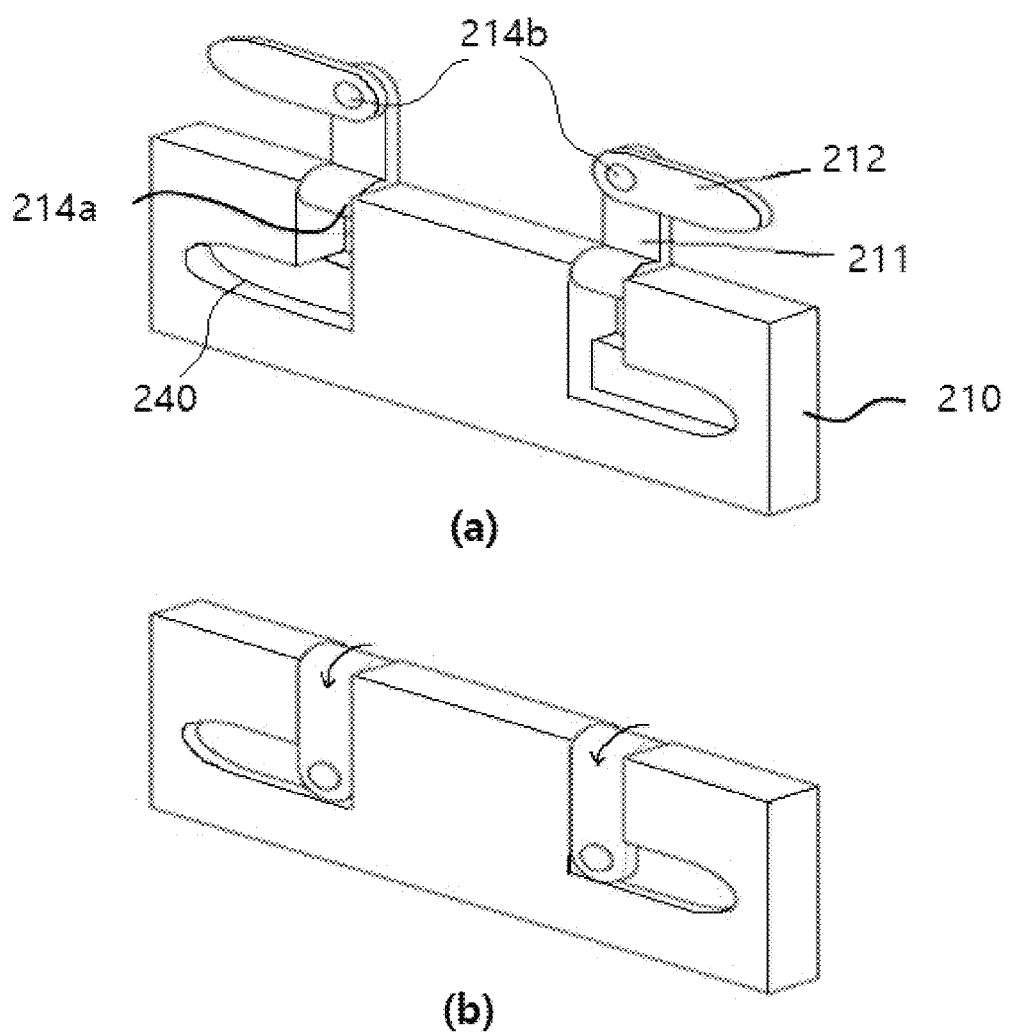
FIGS. 16 and 17 schematically show the structure of a book gripper according to a preferred embodiment of the present invention.
Figure 17:
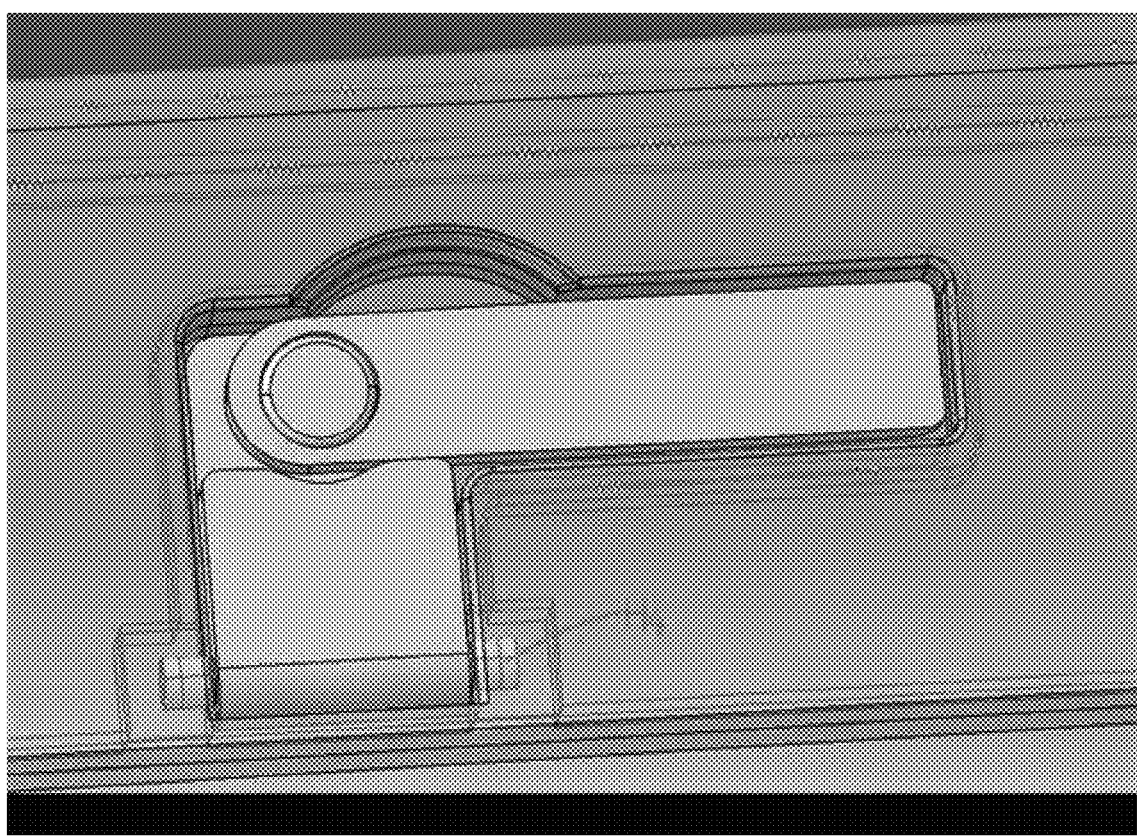

FIGS. 16 and 17 schematically show the structure of a book gripper according to a preferred embodiment of the present invention.

Referring to FIGS. 16 and 17, the book gripper may be configured to be folded or unfolded from the bracket.

The bracket 20 may further include a book gripper receiving groove 240 in which the book gripper is accommodated. The book gripper 210 is accommodated in the book holder receiving groove 240, and when the bracket is unfolded, it can be rotated to fix the book. It may be used by rotating the book gripper according to the user's needs.

The book gripper 210 includes a lower book gripper 211 and an upper fixing holder 212. One end of the lower book gripper is coupled to the book gripper receiving groove by a first fastening member 214a. The first fastening member serves as an axis and is coupled so that the lower book gripper is rotatable up and down. The upper book gripper is coupled by a second fastening member 214b at the other end of the lower fixing holder. The upper book gripper is rotatably coupled to the left and right as the second fastening member serves as an axis. And the book gripper receiving groove 240 may be configured in a shape for accommodating the shape of the book gripper.

The lower book gripper 211 and the first fastening member 214a to which the book gripper receiving groove 240 is coupled is formed with a book gripper hinge as shown in FIG. 9. Accordingly, the lower book gripper 211 can be moved up and down. A central hinge is coupled to the second fastening member 214b, which is a connection part between the upper and lower book gripper 212 and 211. Accordingly, the upper book gripper 212 can be moved left and right.

Here, by inserting a rubber pad or a rubber ring next to the book gripper hinge, the book gripper can give tension to hold the page of the book. Such a method of giving tension can be implemented using other methods such as springs or general hinges.

By configuring as described above, the book gripper 210 can be folded and accommodated in the book holder receiving groove 240 of the bracket 20. When carrying, the book holder can be folded in accordance with the book holder receiving groove.

Figure 18:
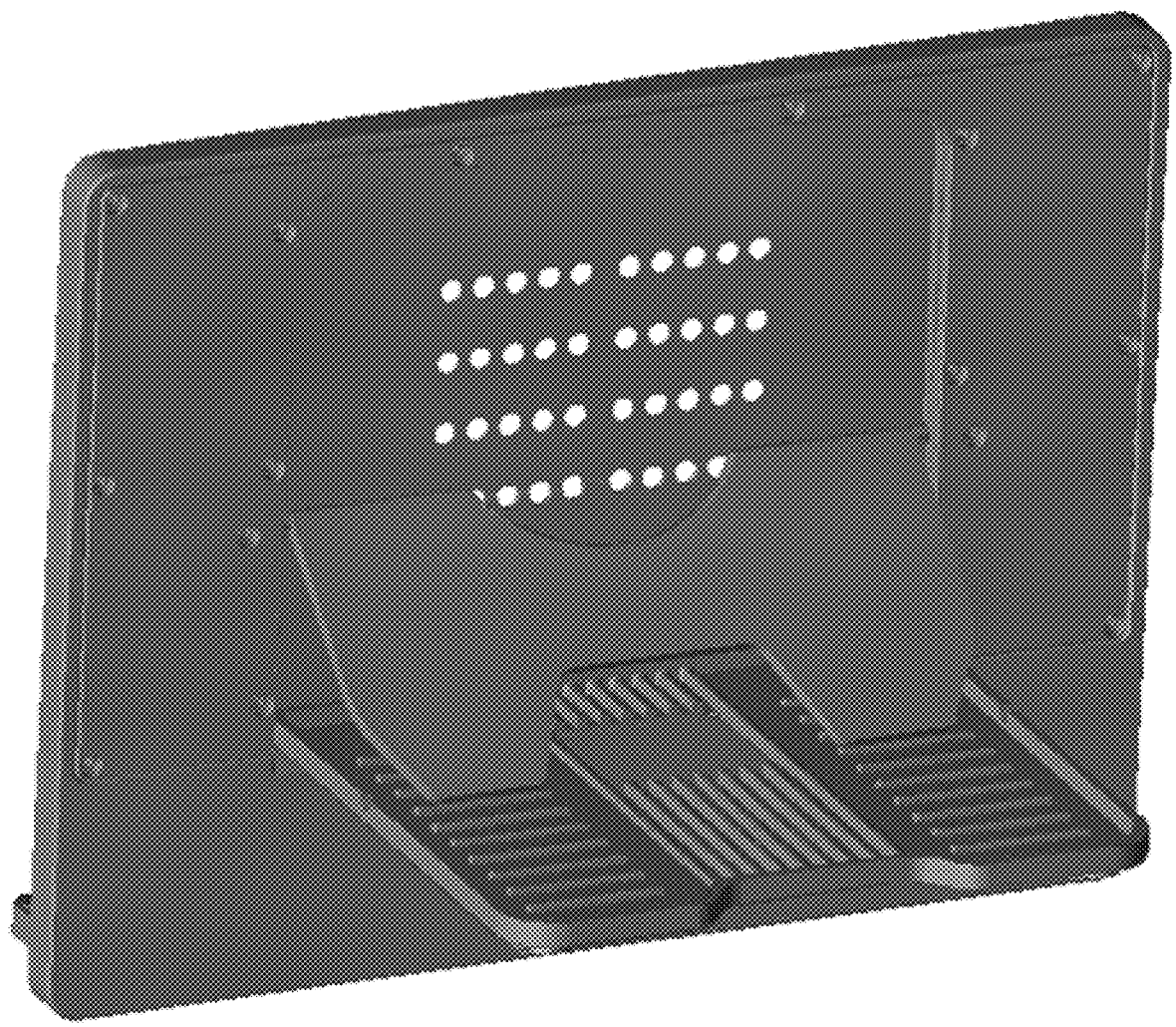
FIG. 18 schematically shows that a heat dissipation through hole for dissipating heat is formed in the top plate according to a preferred embodiment of the present invention.

FIG. 18 schematically shows that a heat dissipation through hole for dissipating heat is formed in the upper plate according to a preferred embodiment of the present invention.

Referring to FIG. 18, according to the present invention, not only reading, but also portable electronic devices such as notebooks and pads can be mounted. In the case of portable electronic devices, heat dissipation is required due to heat generation when used for a long time. Accordingly, a plurality of heat dissipation through-holes or cooling fans may be formed in the top plate 10.

Figure 19:
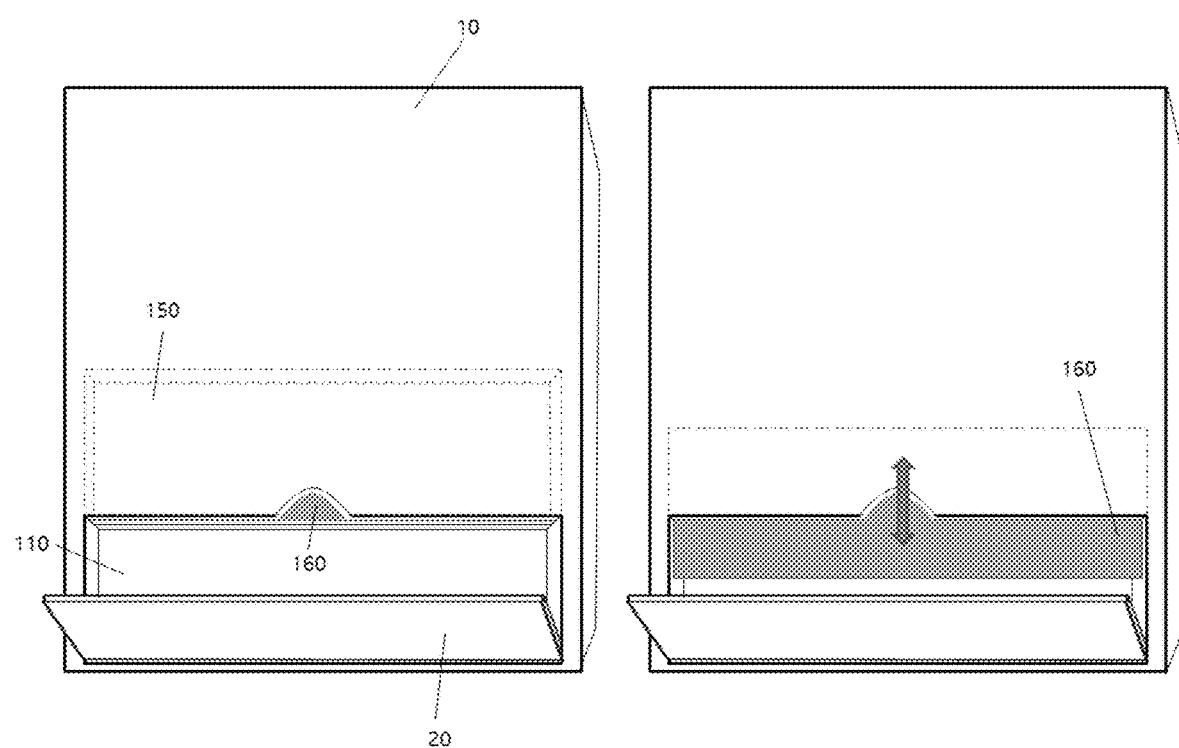
FIG. 19 schematically shows that the cover further includes an upper portion of the bracket receiving part according to a preferred embodiment of the present invention.

FIG. 19 schematically shows that the present further includes the cover in an upper portion of the bracket receiving part according to a preferred embodiment of the present invention.

Referring to FIG. 19, a cover groove 150 is included in the upper part of the bracket receiving part of the top plate. and a cover 160 coupled to the cover groove to be vertically movable. When the bracket is unfolded and the bracket receiving part is opened, the cover can be configured to be covered by sliding the cover downward.

Here, the coupling between the cover groove 150 and the cover 160 may be configured in a conventional sliding coupling method such as a rail structure.

In the detailed description of the present invention described above, it has been described with reference to the preferred embodiment of the present invention, but the protection scope of the present invention is not limited to the above embodiment. Those of ordinary skill in the art will understand that various modifications and variations of the present invention can be made without departing from the spirit and scope of the present invention.

INDUSTRIAL APPLICABILITY

The present invention relates not only to a reading stand for holding books, but also to a portable reading stand capable of holding portable electronic devices such as laptops and tablets. In particular, the present invention relates to a portable reading stand that can freely adjust the height and angle to match the eye level of a correct posture. The present invention is an invention that can increase academic efficiency by maintaining correct posture and study habits, and is a very useful invention in the education industry.

The invention claimed is:

1. A portable reading stand including;
a top plate including a bottom plate unit receiving part, the top plate formed by combining at least one of a front plate and a rear plate; and
a bottom plate unit comprising a bottom plate hinged to both sides of the bottom plate unit receiving part and an angle support supported by the bottom plate to adjust an inclination of the top plate,
wherein, the top plate comprises: a protrusion guard formed on an outer edge of at least one of the front plate and the rear plate;
a bottom plate unit protrusion guard formed on an outer edge of the bottom plate unit receiving part of at least one of the front plate and the rear plate; and
an angle support holder formed on a portion of at least one of the front plate and the rear plate in contact with the angle support,
wherein a portion of the rear plate corresponding to the bottom plate unit receiving part is open,
wherein the angle support is firmly fixed to the angle support holder when the front plate and the rear plate are combined, the angle support holder is capable of being hinged so that the angle support is fastened and prevented from being separated from the top plate,
wherein the top plate is formed while the protrusion guard and the bottom plate unit protrusion guard formed on the outer edge of at least one of the front plate and the rear plate come into contact with the other respective plate so that an inside of the top plate has a hollow space.

2. The portable reading stand according to claim 1, wherein
the angle support includes angle support fastening protrusions formed on both sides of the angle support,
the top plate is formed by fastening the rear plate after the angle support fastening protrusions are placed on the angle support holder of the front plate or the rear plate, and simultaneously the angle support is coupled between the front plate and the rear plate, and
the bottom plate unit is accommodated in the bottom plate unit receiving part so that both of a front and a rear surfaces of the front plate have a flat shape.

3. The portable reading stand according to claim 1, wherein fastening parts for coupling the bottom plate to the bottom plate unit receiving part are provided on both sides of the bottom plate and on both sides of the bottom plate unit receiving part.

4. The portable reading stand according to claim 3, wherein one of the fastening parts is configured to be hinged,
a receiving groove capable of accommodating a bottom plate fastening member is formed on the inner surface of a bottom plate receiving groove,
the bottom plate fastening member is seated in the receiving groove and fixed to the front plate or the rear plate,
the bottom plate fastening member includes a fastening body coupled to the side of the bottom plate and a fastening hole capable of fixing to the inside of the front plate or the rear plate,
in a state in which the fastening body is coupled to the side surface of the bottom plate, the bottom plate fastening member is coupled and fixed through the fastening hole,
therefore, hinge coupling is possible by fastening the bottom plate between the front plate or the rear plate.

5. The portable reading stand according to claim 3, wherein each of the fastening parts includes a fastening groove, a bottom plate fastening protrusion, and an elastic body,
the fastening groove is formed on a side surface of the bottom plate, the bottom plate fastening protrusion is configured to be coupled to the fastening groove, the bottom plate fastening protrusion is formed on a side or an inner surface of the bottom plate unit receiving part, and the elastic body is disposed between the fastening groove and the bottom plate fastening protrusion,
the bottom plate has a structure in which the bottom plate is automatically folded toward the top plate by an elastic force from the elastic body so that the bottom plate is automatically folded without protruding out of the rear surface of the top plate.

6. The portable reading stand according to claim 5, wherein the fastening groove and the bottom plate fastening protrusion is formed at mutually opposite positions.

7. The portable reading stand according to claim 5, wherein at least one of the fastening groove and the bottom plate fastening protrusion comprises a fitting body for providing the elastic force by fitting one end of the elastic body.

8. The portable reading stand according to claim 1, wherein the top plate further comprises a plurality of heat dissipation through-holes or a cooling fan for dissipating heat generated when the portable electronic device is mounted.

9. The portable reading stand according to claim 1, wherein
the top plate has a bracket receiving part for accommodating a bracket at a front bottom of the front plate, the bracket retractably coupled to the bracket receiving part, the bracket comprising a book gripper configured in a curved bar shape coupled to be rotatable up and down and capable of being folded or unfolded on a front surface of the front plate,
the bracket receiving part is configured in a shape to be accommodated together with the bracket in the folded state of the book gripper,
when the bracket is inserted and accommodated into the bracket receiving part, the front surface of the top plate has a flat shape.

10. The portable reading stand according to claim 9, wherein the bracket includes a book gripper receiving groove and a book gripper rotatably coupled to and inserted from the book gripper receiving groove.

11. The portable reading stand according to claim 10, wherein
the book gripper includes a lower book gripper and an upper fixing holder,
one end of the lower book gripper is coupled to the book gripper receiving groove by a first fastening member,
the first fastening member serves as an axis and is coupled so that the lower book gripper is rotatable up and down,
an upper book gripper is coupled by a second fastening member at another end of the lower book gripper,
the upper book gripper is coupled to pivot in both left and right directions as the second fastening member serves as an axis, the book gripper receiving groove is configured in a shape for accommodating the shape of the book gripper.

* * * * *